US011993715B2

(12) United States Patent
Safarowsky et al.

(10) Patent No.: US 11,993,715 B2
(45) Date of Patent: May 28, 2024

(54) LOW COMPRESSION SET SILICON RUBBER COMPOSITION

(71) Applicant: MOMENTIVE PERFORMANCE MATERIALS GMBH, Leverkusen (DE)

(72) Inventors: Oliver Safarowsky, Cologne (DE); Olaf Erdmann, Bergisch Gladbach (DE)

(73) Assignee: MOMENTIVE PERFORMANCE MATERIALS GMBH, Leverkusen (DE)

( * ) Notice: Subject to any disclaimer, the term of this patent is extended or adjusted under 35 U.S.C. 154(b) by 707 days.

(21) Appl. No.: 16/979,609

(22) PCT Filed: Mar. 11, 2019

(86) PCT No.: PCT/EP2019/055997
§ 371 (c)(1),
(2) Date: Sep. 10, 2020

(87) PCT Pub. No.: WO2019/175092
PCT Pub. Date: Sep. 19, 2019

(65) Prior Publication Data
US 2021/0040322 A1    Feb. 11, 2021

(30) Foreign Application Priority Data

Mar. 12, 2018  (EP) ..................... 18161236
Mar. 12, 2018  (EP) ..................... 18161242

(51) Int. Cl.
| | |
|---|---|
| *C08L 83/04* | (2006.01) |
| *C08G 77/12* | (2006.01) |
| *C08G 77/20* | (2006.01) |
| *C08K 3/013* | (2018.01) |
| *C08K 3/22* | (2006.01) |
| *C08K 3/36* | (2006.01) |
| *C08K 5/00* | (2006.01) |
| *C08K 5/3492* | (2006.01) |

(52) U.S. Cl.
CPC .............. *C08L 83/04* (2013.01); *C08G 77/12* (2013.01); *C08G 77/20* (2013.01); *C08K 3/013* (2018.01); *C08K 3/22* (2013.01); *C08K 3/36* (2013.01); *C08K 5/0025* (2013.01); *C08K 5/34924* (2013.01); *C08K 2003/2227* (2013.01); *C08K 2003/2241* (2013.01); *C08K 2003/2265* (2013.01); *C08K 2201/006* (2013.01); *C08K 2201/019* (2013.01); *C08L 2205/03* (2013.01)

(58) Field of Classification Search
CPC ......... C08G 77/12; C08G 77/20; C08L 83/04; C08L 2205/025; C08L 2205/035; B01J 23/40; C08K 3/36
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,197,432 A | 7/1965 | Lamoreaux | |
| 3,220,972 A | 11/1965 | Lamoreaux | |
| 3,419,593 A | 12/1968 | Willing | |
| 3,715,334 A | 2/1973 | Karstedt | |
| 3,775,452 A | 11/1973 | Karstedt | |
| 3,814,730 A | 6/1974 | Karstedt | |
| 4,510,094 A | 4/1985 | Drahnak | |
| 4,530,879 A | 7/1985 | Drahnak | |
| 5,861,448 A * | 1/1999 | Griffith | .................... C08K 9/06 524/789 |
| 5,989,719 A | 11/1999 | Loiselle | |
| 7,511,110 B2 | 3/2009 | Fehn | |
| 2003/0199603 A1 | 10/2003 | Walker et al. | |
| 2010/0105815 A1 | 4/2010 | Schmidt | |
| 2019/0225806 A1* | 7/2019 | Muramatsu | ............ C08G 77/12 |
| 2020/0181408 A1* | 6/2020 | Beyer | ................. A61L 28/0015 |

FOREIGN PATENT DOCUMENTS

| | | |
|---|---|---|
| EP | 0122008 A1 | 10/1984 |
| EP | 0146307 A2 | 6/1985 |
| EP | 1672031 A1 | 6/2006 |
| EP | 2011821 A1 | 1/2009 |
| JP | 2008-74913 A | 4/2008 |
| JP | 2017-2165 | 1/2017 |
| WO | 2009/003819 A1 | 6/2008 |
| WO | 2009003819 A1 | 1/2009 |

OTHER PUBLICATIONS

Freeman (Silicones, Published For The Plastics Institute, ILIFFE Books Ltd., (1962)) p. 27.*
International Search Report and Written Opinion from PCT/EP2019/055997 dated Apr. 5, 2019.
JP Office Action from Japanese Patent Office (English Translation), from Ser. No. 2020-548,798, dated Jan. 10, 2023.

* cited by examiner

Primary Examiner — Marc S Zimmer
(74) Attorney, Agent, or Firm — Joseph E. Waters

(57) ABSTRACT

The present invention relates to curable silicone rubber composition which can be cured to silicone rubber composition having low compression set and the use of such a curable silicone rubber composition.

22 Claims, No Drawings

LOW COMPRESSION SET SILICON RUBBER COMPOSITION

The present invention relates to a curable silicone rubber composition which can be cured to silicone rubber composition having low compression set and the use of such a curable silicone rubber composition for the manufacture of automotive parts such as a connector seals, electrical and electronic parts, packaging parts, construction parts such as sealants, household parts etc.

Modern cars and trucks depend on electrical and electronical systems to perform according to technical regulations, enable latest technology and implement consumer wishes. Electrical failures in best case lead to malfunction of car devices like radio, light, ventilation etc. or in worst case lead to vehicle breakdown or violation of legal standards like emissions.

Depending on the car maker, the car model and the car equipment more than 3 km of electrical wires can be in a car and the so-called wire-harness would connect up to more than 200 electronics and electric (E&E) devices utilizing electrical connectors. Many of the electrical connectors have to be protected against moisture and environment attacks potentially causing contact failures. In most of those connectors, self-lubricating silicone elastomers are used for sealing the connector housings against each other and the cable/contact assemblies against the housings.

The lubrication in these self-lubricating silicone elastomers is achieved through phenyl-silicone fluids, which exudes over time from the cured seals. The lubrication eases cable and connector assembly. The typical hardness for cable and interface (peripheral) seals ranges between 30 and 50 Shore A. Softer materials are often used for mat-seals with multiple contact points. Harder materials are used mainly for peripheral seals, depending on maker and system design.

Through increased temperature under the hood caused by better encapsulation, higher engine efficiency, downsizing, implementation of turbo-chargers in combination with less available space some of the electrical connection points have to withstand higher temperatures nowadays.

Current sealed connector assemblies are fulfilling the T3 temperature class of relevant automotive specs like the SAE US car spec [US CAR] for a temperature range of −40° C. to 125° C. To fulfil the standard for the higher temperature classes T4 (−40° C. to 150° C.) and T5 (−40° C. to 175° C.) new technical approaches for the silicone elastomer sealing materials are necessary to provide the necessary heat-stability and low long-term compression set over the test period of 1008 hours.

Compression set according to ISO 815 describes the permanent setting/deformation after compression and storage under specific time and temperature conditions. Desirable is a compression-set of zero, so the seal would completely recover after the load or assembly has been removed.

In reality, compression-set describes indirectly if sealing force is still available (no permanent setting of the material). For long-term reliable sealing performance a very low long-term (e.g. 1000 h) compression set is desired.

WO 2009/003819 relates to high temperature vulcanized silicone rubbers with improved tracking and erosion resistance, comprising melamine cyanurate as a filler in an amount of f 2 to 40 parts (by weight) per 100 parts (by weight) of the silicone base. The introduction of melamine cyanurate is said to lead an improvement of the tracking resistance and flame retardancy without deteriorating the mechanical properties. WO 2009/003819 is silent about curable silicone rubber composition providing low compression set.

The present inventors searched for curable silicone rubber composition, which meet in particular the need of low compression sets at higher temperatures for a prolonged period of time. As a result, the present inventors found a specific curable silicone rubber composition, satisfying specific requirements, in particular, regarding the organohydrogensiloxane component, which meets the above needs.

In accordance with the present invention curable silicone rubber compositions are provided, which are curable to vulcanize to a cured composition having at least one compression set value, selected from the group of the following compression sets: 30 percent or less, preferably 25 percent or less, more preferably 20 percent or less after testing at 175° C. for 144 hours, and 50 percent or less, preferably 40 percent or less after testing at 175° C. for 1000 hours, comprising:

A) 100 parts by weight of at least one polyorganosiloxane having at least one alkenyl group $R^1$,
B) 0.01 to 100 parts by weight of at least one organohydrogensiloxane having at least two SiH groups,
   wherein component B) is selected from one or more organohydrogensiloxanes having at least two SiH groups, selected from one or more polyorganohydrogensiloxanes of the general formula (2):

$$[M_a D_b T_c Q_d Z_e]_m \quad (2)$$

wherein:
M=$R_3SiO_{1/2}$, and/or M*
D=$R_2SiO_{2/2}$, and/or D*
T=$RSiO_{3/2}$, and/or T*
Q=$SiO_{4/2}$,
with M*=$HR_2SiO_{1/2}$, D*=$HRSiO_{2/2}$, T*=$HSiO_{3/2}$,
Z is a divalent optionally substituted hydrocarbyl bridging group with up to 14 carbon atoms between two siloxy groups, which siloxy groups are as defined before, and
R is independently selected from saturated or aromatic organic groups,
a=0.01-10 preferably=2-5, most preferably=2
b=0-1000 preferably=10-500
c=0-50 preferably=0
d=0-5 preferably=0
e=0-3 preferably=0
m=1-1000, preferably=1-500, most preferably=1,
with the proviso that there are at least two groups selected from M*, D* and T*,
C) at least one transition metal catalyst,
D) 0.01 to 100 parts by weight of at least one reinforcing filler with a BET surface area of at least 50 m²/g, and
G) optionally up to 100 parts by weight one or more auxiliary additives,
wherein Component A) comprises at least one of component A1), and at least one of component A2), which are defined as follows:
A1) at least one polyorganosiloxane of the formula (Ia),

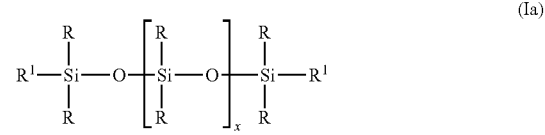

wherein each R is independently selected from saturated or aromatic organic groups, each $R^1$ is independently selected from alkenyl groups, and x is ≥0, A2) at least one polyorganosiloxane of the formula (Ib),

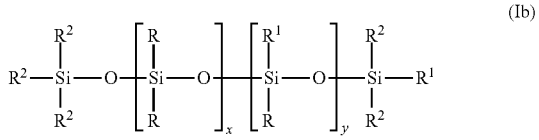

(Ib)

wherein x, R and $R^1$ are as defined above; $R^2$ is selected from R or $R^1$, and y is ≥1, and wherein preferably the molar ratio of the alkenyl groups $R^1$ in component A2) to the alkenyl groups $R^1$ in component A1) is in the range of 0.3 to 8, preferably 0.6 to 6, more preferably 1 to 5, and wherein the composition satisfies one, preferably two or more of the following requirements a) to c):

a) the molar ratio of all SiH groups to all groups $SiR^1$ (wherein $R^1$ is as defined above) in the composition (or short: the molar ratio of the SiH groups to the groups $SiR^1$) is ≤3, preferably ≤2, more preferably between 1.0 and 1.8; and b) the key impact factor KpSiH in mmol/g as defined below is between 2.5 to 17.5 mmol/g; preferably 2.5 to 15 mmol/g;

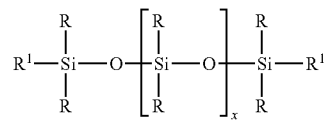

wherein
"parts $B_i$" are the weight percentages of the i-th component B) based on the total weight of the composition,
"SiH of $B_i$" is the SiH-content of the i-th component B) in mmol/gram,
"SiH($B_i$)" is the number of SiH-groups in the i-th component B) per molecule,
"SiH/$SiR^1$" is as defined under item a) above, $$P_i(D^*D^*) = \left[\frac{\text{mol number of } D^* \text{ groups}}{\text{mol number of groups } (D^* + D + M + M^*)}\right]^2$$

wherein
D is $R_2SiO_{2/2}$ in component B),
M is $R_3SiO_{1/2}$ in component B),
$D^*$ is $HRSiO_{2/2}$ in component B),
$M^* = HR_2SiO_{1/2}$ in component B), wherein R is as defined above, and
$P_i$ ($D^*D^*$) for each respective i-th component B), having the required units, is preferably 0 to 1, more preferably 0 to 0.9, most preferably 0 to 0.85, c) the molar ratio of the alkenyl groups $R^1$ in component A2) to the alkenyl groups $R^1$ in component A1) is in the range of 0.3 to 8, preferably 0.6 to 6, more preferably 1 to 5.

In the following the preferred embodiments of the invention are described:

Component A) Polyorganosiloxane Having at Least One Alkenyl Group $R^1$

In the present invention Component A) comprises at least one of component A1), and at least one of component A2), which are defined as follows:

A1) at least one polyorganosiloxane of the formula (Ia),

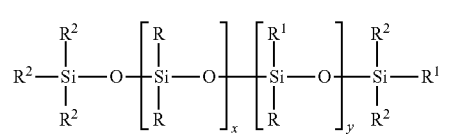

(Ia)

wherein each R is independently selected from saturated or aromatic organic groups, each $R^1$ is independently selected from alkenyl groups, and x is ≥0, A2) at least one polyorganosiloxane of the formula (Ib),

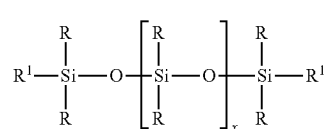

(Ib)

wherein x, R and $R^1$ are as defined above; $R^2$ is selected from R or $R^1$, and y is ≥1.

In a preferred embodiment of the invention in the curable silicone rubber composition the molar ratio of the alkenyl groups $R^1$ in component A2) to the alkenyl groups in component A1) is in the range of 0.3 to 8, preferably 0.6 to 6, more preferably 1 to 5.

Component A1)

The inventive composition comprises at least one polyorganosiloxane A1) of the formula (Ia):

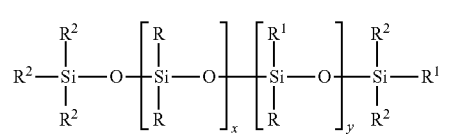

(Ia)

wherein each R is independently selected from saturated or aromatic organic groups, and $R^1$ is selected from alkenyl groups, and x is ≥0, preferably x is ≥10, more preferably x is ≥100, and preferably x is less than 2000, more preferably less than 1500, and even more preferably less than 1000.

Preferably the viscosity of component A1) at 25° C. is less than 100000 mPa·s, preferably the viscosity is more than 5000 mPa·s (measured at a shear rate of D=10 $s^{-1}$ at 25 C.).

The viscosities of such polymers are preferably in the range of 10 to 100,000 mPa·s, more preferred 40 to 70,000 mPa·s (measured at a shear rate of D=10 $s^{-1}$ at 25 C.).

The viscosity of component A1) refers to the viscosity of a single component A1) or a mixture of components (A). The latter case of the mixture includes with it the presence of individual components A1) that may have a viscosity exceeding 100000 mPa·s at 25° C.

The groups R are preferably selected from optionally substituted alkyl groups with up to 30 carbon atoms, and optionally substituted aryl groups with up to 30 carbon atoms. More preferably the groups R are selected from n-, iso, or tertiary alkyl, alkoxyalkyl, $C_5$-$C_{30}$-cyclic alkyl, or $C_6$-$C_{30}$-aryl, alkylaryl, which groups optionally can contain one or more of —O—, —NH—, —S—, and

and which groups may optionally be substituted by one or more halogen (such as chlorine or fluorine) and one or more hydroxy groups.

Examples of suitable monovalent hydrocarbon radicals include alkyl radicals, preferably such as $CH_3$—, $CH_3CH_2$—, $(CH_3)_2CH$—, $C_8H_{17}$— and $C_{10}H_{21}$—, and cycloaliphatic radicals, such as cyclohexylethyl, aryl radicals, such as phenyl, tolyl, xylyl, aralkyl radicals, such as benzyl and 2-phenylethyl. Preferable monovalent halohydrocarbon radicals have the formula $C_nF_{2n+1}CH_2CH_2$— wherein n has a value from 1 to 10, such as, for example, $CF_3CH_2CH_2$—, $C_4F_9CH_2CH_2$—, $C_6F_{13}CH_2CH_2$—, $C_2F_5$—$O(CF_2$—$CF_2$—$O)_{1-10}CF_2$—, $F[CF(CF_3)$—$CF_2$—$O]_{1-5}$—$(CF_2)_{0-2}$—, $C_3F_7$—$OCF(CF_3)$— and $C_3F_7$—$OCF(CF_3)$—$CF_2$—$OCF(CF_3)$—.

Most preferred groups for R include methyl, phenyl, and 3,3,3-trifluoropropyl, and particularly preferred R is methyl.

$R^1$ is preferably selected from aliphatic unsaturated groups, comprising C=C-group-containing groups (=alkenyl groups), e.g.: n-, iso-, tertiary or cyclic alkenyl groups with up to 30 carbon atoms, $C_6$-$C_{30}$-cycloalkenyl, $C_8$-$C_{30}$-alkenylaryl, cycloalkenylalkyl, such as vinyl, allyl, methallyl, 3-butenyl, 5-hexenyl, 7-octenyl, ethyliden-norbornyl, styryl, vinylphenylethyl, norbornenyl-ethyl, limonenyl, optionally containing one or more —O— atoms or F-atoms.

Preferred groups for $R^1$ are vinyl, 5-hexenyl, cyclohexenyl, limonyl, styryl, vinylphenylethyl. Most preferred group $R^1$ is a vinyl.

The radicals R and/or $R^1$ can be equal or different.

x is an average value calculated from the number-average molecular weight $M_n$ of the polydiorganosiloxanes of the formula (Ia), which is determined by gel permeation chromatography using polystyrene standard.

x is preferably 10-2000, more preferably 100-1000.

The average number molecular weight $M_n$ (determined by gel permeation chromatography using polystyrene standard) is preferably in the range of up to 200000 g/mol, the more preferred range is up to 100000 g/mol.

Preferred structures of the polydiorganosiloxane A1) include:

$ViMe_2SiO(Me_2SiO)_{10-2000}SiMe_2Vi$ (1a), $ViPhMeSiO(Me_2SiO)_{10-2000}SiMePhVi$ (1b), wherein Vi is a vinyl group, Me is a methyl group and Ph is a phenyl group. Particularly preferred are polydiorganosiloxanes of formula (1a).

In a preferred embodiment of the invention a mixture of at least two polydiorganosiloxanes A1) is used which differ in their chain lengths. Preferably, a mixture of the following two polydiorganosiloxanes A1-1) and A1-2) is used:

A1-1):

$R^1R_2SiO(R_2SiO)_{x1}SiR_2R^1$ wherein x1 is 10 to 700, and R and $R^1$ are as defined above, preferably R is methyl and $R^1$ is vinyl,

A1-2):

$R^1R_2SiO(R_2SiO)_{x2}SiR_2R^1$ wherein x2 is >700, preferably >800, and R and $R^1$ are as defined above, preferably R is methyl and $R^1$ is vinyl.

The weight ratio A1-1) to A1-2) is preferably 99:1 to 1:99, preferably 49:51 to 10:90.

These polymers can be prepared by any of the conventional methods for preparing triorganosiloxane-terminated polydiorganosiloxanes. For example, a proper ratio of the appropriate hydrolyzable silanes, e.g., vinyldimethylchlorosilane, trimethylchlorosilane, tetrachlorosilane, methyltrichlorosilane and dimethyldichlorosilane, or its corresponding alkoxysilanes, can be co-hydrolyzed and condensed. Other reaction routes may run alternately over equilibration reactions of 1,3-divinyltetraorganodisiloxane, e.g. symmetrical divinyldimethyldiphenylsiloxane or divinyltetramethylsiloxane, which furnishes the endgroups of the polydiorganosiloxane, which may be equilibrated with an appropriate polydiorganosiloxane, e.g., octamethylcyclotetrasiloxane, in the presence of an acidic or basic catalyst.

Preferably the alkenyl content of the component A1) is in the range of 0.001 to 20 mol %, especially 0.01 to 10 mol % based on the entire organic groups attached to silicon atoms.

The alkenyl content of the components (A) can be determined here by way of $^1H$ NMR—see A. L. Smith (ed.): The Analytical Chemistry of Silicones, J. Wiley & Sons 1991 Vol. 112 pp. 356 et seq. in Chemical Analysis ed. by J. D. Winefordner.

Component A2)

The inventive composition comprises at least one polyorganosiloxane A2) of the formula (Ib):

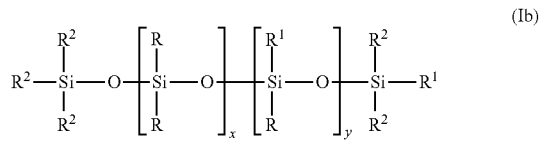

(Ib)

wherein x, R and $R^1$ are as defined above; and $R^2$ is selected from R or $R^1$ as defined above and y is ≥1.

The siloxane units with radicals R and/or $R^1$ can be equal or different for each silicon atom. In a preferred embodiment the structure is $R^1{}_pR_{3-p}SiO[R_2SiO]_x[R^1RSiO]_ySiR^1{}_pR_{3-p}$ (1c)

wherein R and $R^1$ are as defined above,
p=0-3, preferably 1,
x=10-2000, preferably 100-1000,
y=1-500, preferably 1-200, more preferably 1-100, even more preferably 1-50.

The purpose of component A2) a so-called alkenyl rich, suitably vinyl rich polymer is to modify mechanical properties and crosslinking density.

Preferred polydiorganosiloxanes A2) are represented by the formulas $Me_3SiO(Me_2SiO)_x(MeR^1SiO)_ySiMe_3$ (1d), $R^1Me_2SiO(Me_2SiO)_x(MeR^1SiO)_ySiMe_2R^1$ (1e), whereby
x=>0-2000, preferably 10 to 800, more preferably 50 to 700, y=>0-500, preferably 5 to 200, more preferably 7 to 100,
x+y=>10, preferably >15, more preferably >50, more preferably >57, more preferably >70, more preferably >75, $R^1$, R are as defined above, More preferred polydiorganosiloxanes A2) are represented by the formula (1e).

In a preferred embodiment of the invention a mixture of at least two polydiorganosiloxanes A2) is used which differ in their chain lengths. Preferably a mixture of the following two polydiorganosiloxanes A2-1) and A2-2) is used:

A2-1):

$$R^1Me_2SiO(Me_2SiO)_{x1}(MeR^1SiO)_{y1}SiMe_2R^1 \quad (1f),$$

x1=>100-2000, preferably 200 to 800, more preferably 300 to 700,
y1=>10-500, preferably 15 to 200, more preferably 30 to 100,
x1+y1=>110, preferably >215, more preferably >300, more preferably >330, more preferably >500
$R^1$, R are as defined above,

A2-2):

$$R^1Me_2SiO(Me_2SiO)_{x2}(MeR^1SiO)_{y2}SiMe_2R^1 \quad (1f),$$

x2=>10-100, preferably 20 to 100, more preferably 30 to 90,
y2=>1-100, preferably 5 to 70, more preferably 7 to <30,
x2+y2=>11, preferably >30, more preferably >50,
$R^1$, R are as defined above, The weight ratio A2-1) to A2-2) is preferably 99:1 to 1:99, preferably 51:49 to 90:10.

With respect to the preferred embodiments for R and $R^1$ it is referred to the definition of the polydiorganosiloxanes A1) above.

$R^1$=preferably vinyl, hexenyl, cyclohexenyl, limonyl, styryl, vinylphenylethyl. Most preferred $R^1$ is vinyl.

Preferred groups for R are methyl, phenyl, 3,3,3-trifluoropropyl, most preferred is methyl.

The preferred value of y (or y1 or y2) is less than 0.5*x (or x1 or x2), preferably 0.0001*x (or x1 or x2) to 0.25*x (or x1 or x2) more preferably 0.0015*x (or x1 or x2) to 0.2*x (or x1 or x2). Further preferred structures of polydiorganosiloxane A2) are $$Vi_pMe_{3-p}SiO(Me_2SiO)_{10-2000}(MeViSiO)_{1-1000}SiMe_{3-p}Vi_p \quad (1f),$$

$$Me_3SiO(Me_2SiO)_{10-2000}(MeViSiO)_{1-1000}SiMe_3 \quad (1g),$$

$$PhMeViSiO(Me_2SiO)_{10-2000}(MeViSiO)_{1-1000}SiPhMeVi \quad (1h)$$

wherein Me=methyl, Vi=vinyl, Ph=phenyl, and p=0 to 3, preferred p=1.

The average number molecular weight $M_n$ is preferably in the range of up to 100000 g/mol, the more preferred range up to 50000 g/mol, which is determined preferably using GPC with polystyrene standards.

In a preferred embodiment the weight ratio of the polydiorganosiloxane A1) to polydiorganosiloxane A2) is 100:1 to 1:1, preferably 20:1 to 2:1.

It is also possible in the present invention that Component A) comprises only at least one of component A1) or only at least one of component A2), that is components A1) and A2 are not used together but are used alone.

Component B): Organohydrogensiloxane Having at Least Two SiH Groups

The curable silicone rubber composition comprises component B), that is, at least one organohydrogensiloxane having at least two SiH groups wherein component B) is selected from one or more polyorganohydrogensiloxanes of the general formula (2):

$$[M_aD_bT_cQ_dZ_e]_m \quad (2)$$

wherein:
M=$R_3SiO_{1/2}$, and/or M*
D=$R_2SiO_{2/2}$, and/or D*
T=$RSiO_{3/2}$, and/or T*
Q=$SiO_{4/2}$,
with M*=$HR_2SiO_{1/2}$, D*=$HRSiO_{2/2}$, T*=$HSiO_{3/2}$,
Z is a divalent optionally substituted hydrocarbyl bridging group with up to 14 carbon atoms between two siloxy groups, which siloxy groups are as defined before, and
R is as defined above,
a=0.01-10 preferably=2-5, most preferably=2
b=0-1000 preferably=10-500
c=0-50 preferably=0
d=0-5 preferably=0
e=0-3 preferably=0
m=1-1000, preferably=1-500, most preferably=1,
with the proviso that there are at least two groups selected from M*, D* and T*.

Preferably, the component B) is selected from polysiloxanes that have only methyl or phenyl groups, even more preferably only methyl groups as organic residues.

Preferably, the polyorganohydrogensiloxanes B) have at least 10, preferably at least 15, more preferably at least 20, still more preferably at least 25 and most preferably at least 30 silicon atoms.

The siloxy units can be distributed blockwise or randomly in the polymer chain.

The aforementioned indices should represent the average polymerization degree $P_n$ based on the average number molecular mass $M_n$.

The range for M-, D-, T- and Q-units present in the molecule can cover nearly all values representing fluids, flowable polymers, liquid and solid resins. It is preferred to use liquid linear, cyclic or branched siloxanes. Optionally these siloxanes can comprise additional traces of $C_1$-$C_6$-alkoxy or Si-hydroxy groups remaining from the synthesis.

Preferred structures of component B) in the compositions of this invention are siloxanes of formula (2a) to (2e).

$$H_{a1}(R)_{3-a1}Si[RHSiO]_p[R_2SiO]_q[RR^1SiO]_zSi(R)_{3-a1}H_{a1} \quad (2a)$$

more specifically:

$$HR_2SiO(R_2SiO)_q(RR^1SiO)_z(RHSiO)_pSiR_2H \quad (2b)$$

$$HMe_2SiO(Me_2SiO)_q(RR^1SiO)_z(MeHSiO)_pSiMe_2H \quad (2c)$$

$$Me_3SiO(MeHSiO)_pSiMe_3 \quad (2d)$$

$$Me_3SiO(Me_2SiO)_q(RR^1SiO)_z(MeHSiO)_pSiMe_3 \quad (2e)$$

wherein R and $R^1$ are as defined above, R is preferably methyl and/or phenyl, $R^1$ is preferably vinyl, and index 'a1' is 0 or 1,
p=0-1000, preferably=0-500,
q=0-650, preferably=0-100,
z=0-65, preferably=0
2≤p+q+z<1000, preferably 10≤p+q+z<650.
Most Preferred is $$HR_2SiO(R_2SiO)_q(RR^1SiO)_z(RHSiO)_pSiR_2H \quad (2b)$$

with p, q, z as defined before, with z is preferably 0 and p is preferably 0, and q is preferably 5 to 50, more preferably 10 to 30.

In the above formulas (2a) to (2e) the molar ratio of SiH-groups to all Si-atoms is preferably more than 0.01 and preferably up to 0.7, and the total number of Si atoms is preferably at least 7, more preferably at least 15 and even more preferably at least 20.

Furthermore, the use of resinous polyorganohydrogensiloxanes of the following formula is preferred:

$$\{[T][R^{29}O_{1/2}]_n\}_m \quad (2f)$$

$$\{[Q][R^{29}O_{1/2}]_n[M]_{0.01\text{-}10}[T]_{0\text{-}50, \text{preferably } 0}[D]_{0\text{-}1000, \text{preferably } 0}\}_m \quad (2g)$$

wherein
Q, T, M, D are as defined above,
n=0 to 3, preferably n=0,
m is as defined above,
$R^{29}$ is hydrogen, $C_1$-$C_{25}$-alkyl, such as methyl, ethyl, n-propyl, iso-propyl, n-, iso- and tert.-butyl, alkanoyl, such acyl, aryl, —N=CHR, such as butanonoxime, alkenyl, such as propenyl,
with the proviso that there are at least two groups selected from M*, D* and T*. Most preferred resinous polyorganohydrogensiloxanes are of the formula consisting of Q and M* units, e.g. $\{[Q][M^*]_{0.01\text{-}10, \text{preferably } 1\text{-}10}\}_m \quad (2h)$ wherein Q, M* and m are as defined above, and m is preferably 1 to 20.

One preferred embodiment of the compounds (2 g) is provided by way of example by monomeric to polymeric compounds which can be described via the formula $[(Me_2HSiO_{0.5})_k SiO_{4/2}]_{1\text{-}1000}$ wherein index k is from 0.3 to 4. Such liquid or resinous molecules can contain significant concentrations of SiOH— and/or ($C_1$-$C_6$)-alkoxy-Si groups of up to 10 mol. % related to the silicon atoms.

Particular preferred resinous polyorganohydrogensiloxanes B) include e.g.

$M^*_2 D_{10\text{-}30}$, $Q(M^*)_4$, $M_2 D_{10\text{-}30} D^*_{10\text{-}30}$, and $[M^*_{1\text{-}4}Q]_{1\text{-}4}$.

Preferred viscosities of the resinous polyorganohydrogensiloxanes B) are 1 to 100 mPa·s at 25 C at a shear rate of D=10 s$^{-1}$.

Specific examples of preferred suitable compounds for component B) in the compositions of this invention include $Me_3SiO—(MeHSiO)_{2\text{-}50}—SiMe_3$, $Me_3SiO—(MeHSiO)_{2\text{-}50}(Me_2SiO)_{1\text{-}100}SiMe_3$, $(MeHSiO)_{3\text{-}7}$, $HMe_2SiO—(MeHSiO)_{0\text{-}60}(Me_2SiO)_{1\text{-}250}SiMe_2H$ $HMe_2SiO(Me_2SiO)_{0\text{-}30}(MePhSiO)_{0\text{-}30}(MeHSiO)_{2\text{-}50}SiMe_2H$, $Me_3SiO(Me_2SiO)_{0\text{-}30}(MePhSiO)_{0\text{-}30}(MeHSiO)_{2\text{-}50}SiMe_3$, $Me_3SiO(Me_2SiO)_{0\text{-}30}(Ph_2SiO)_{0\text{-}30}(MeHSiO)_{2\text{-}50}SiMe_3$, wherein in each formula the molar ratio of SiH-groups to all Si-atoms is preferably more than 0.01 and the total number of Si atoms is preferably at least 7, more preferably have at least 10, more preferably at least 15, most preferably at least 20 atoms.

The SiH-content of the polyorganohydrogensiloxanes B) is preferably at least 0.1 mmol/g, more preferably at least 0.2 mmol/g, and at most preferably 17 mmol/g, more preferably at most 15 mmol/g, more preferably 0.1 to 17 mmol/g, and most preferably 0.2 to 13 mmol/g. If more than one component B) is used, these Si-contents apply for each specific component B) used.

Most preferred are compounds of the formula $HMe_2SiO—(MeHSiO)_{0\text{-}60}(Me_2SiO)_{1\text{-}250}SiMe_2H$ even more preferred in admixture with at least one resinous polyorganohydrogensiloxane B), preferably of formula $[M^*_{1\text{-}4}Q]_{1\text{-}40}$, preferably in a weight ratio of $$HMe_2SiO—(MeHSiO)_{0\text{-}60}(Me_2SiO)_{1\text{-}250}SiMe_2H / [M^*_{1\text{-}4}Q]_{1\text{-}40}$$

in the range of 49:51 to 1:99.

The component B) can be used as a single component of one polyorganohydrogensiloxane or preferably as mixtures of at least two thereof. Most preferred are mixtures of linear polyorganohydrogensiloxanes consisting of D and/or D* and M and/or M* units and resinous polyorganohydrogensiloxanes, consisting of Q and M and/or M* units, preferably in a weight ratio of 49:51 to 1:99.

If an increase of the cure rate is required, it is preferred to use some organopolysiloxanes B) having $HMe_2SiO_{0.5}$— units or homo MeHSiO-polymers to adjust the cure rate to shorter times.

If it is necessary to still further increase the cure rate, this can be achieved by way of example via an increase of the molar ratio of SiH to Si-alkenyl, or an increased amount of catalyst C).

The component B) has preferably a viscosity at 25° C. from 2 to 2000 mPa·s, preferably from 1 to 1000 mPa·s, still more preferably 2 to 100 mPa·s (preferably measured at a shear rate of D=10 s$^{-1}$).

Preferably, the crosslinker B) should have at least 2, more preferably at least 3, in some instances also more than 15 and more than 20 SiH-groups per molecule.

In a preferred embodiment of the invention the curable silicone rubber composition comprises at least one resin based organohydrogensiloxane comprising at least one unit selected from T, T* and Q, preferably Q.

In a particularly preferred embodiment of the invention the curable silicone rubber composition, at least two different organohydrogensiloxanes B) are used. Furthermore in the curable silicone rubber composition according to the invention preferably the organohydrogensiloxanes B) are selected from the group of B1) a resin based organohydrogensiloxane having >2 terminal SiH groups, preferably comprising at least one unit selected from T, T* and Q, preferably Q, and B2) an organohydrogensiloxane having 2 or more SiH groups and being different from B1).

Transition Metal Catalyst C)

The curable silicone rubber compositions according to the invention comprise at least one transition metal catalyst C).

Component C) is preferably selected from the group of organo metal compounds, salts or metals, having the ability to catalyze hydrosilylation wherein the metal is selected from the group of Ni, Ir, Rh, Ru, Os, Pd and Pt compounds as taught in U.S. Pat. Nos. 3,159,601; 3,159,662; 3,419,593; 3,715,334; 3,775,452 and 3,814,730. Most preferred are platinum compounds.

Preferably the transition metal catalyst C) is selected from hydrosilylation catalysts comprising at least one metal selected from the group consisting of platinum, rhodium, palladium, ruthenium and iridium.

The catalyst component C) for the hydrosilylation reaction of the inventive composition is a compound, which facilitates the reaction of the silicon-bonded hydrogen atoms of component (B) with the silicon-bonded olefinic hydrocarbon substituents of component (A). The metal or organo metal compound is generally based on a platinum group metal. Without wishing to be bound by theory, it is believed that the catalyst (C) includes complexes with sigma- and pi-bonded carbon ligands as well as ligands with S—, N, or P atoms, metal colloids or salts of the afore mentioned metals. The catalyst can be present on a carrier such as silica gel or powdered charcoal, bearing the metal, or a compound or complex of that metal. Preferably, the metal of component (C) is any platinum complex compound.

A typical platinum containing catalyst component in the polyorganosiloxane compositions of this invention is any form of platinum (0), (II) or (IV) compounds, which are able to form complexes. Preferred complexes are Pt-(0)-alkenyl complexes, such alkenyl, cycloalkenyl, alkenylsiloxane such vinylsiloxane, because of its easy dispersibility in polyorganosiloxane compositions.

A particularly useful form of the platinum complexes are the Pt(0)-complexes with aliphatically unsaturated organosilicon compound such as a 1,3-divinyltetramethyldisiloxane (Vinyl-M2 or Karstedt catalyst:

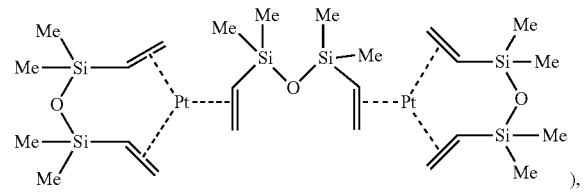

as disclosed by e.g. U.S. Pat. No. 3,419,593 incorporated herein by reference are especially preferred, cyclohexene-Pt, cyclooctadiene-Pt and tetravinyltetramethyl-tetracyclosiloxane (Vinyl-D4)-Pt, e.g. Ashby's catalyst, a Pt(0) complex intetramethyltetravinylcyclotetrasiloxane with the empirical formula $Pt[(C_3H_6SiO)_4]_x$.

Most preferred catalyst component C) is a $Pt^0$ complex with tetramethyl-tetravinylcyclotetrasiloxane that contains about 1 to 3 wt % Pt, preferably 2 wt % Pt, in particular, Ashby's catalyst.

Also preferably is a so-called Lamoreaux catalyst, which is a platinum (II) complex compound, obtained from chloroplatinic acid hexahydrate and octyl alcohol (as described for example in U.S. Pat. No. 3,197,432 or U.S. Pat. No. 3,220,972). Preferably are Pt(0) or Pt(II) catalysts, with preference to Ashby and Lamoreaux platinum catalysts.

The amount of platinum-containing catalyst component that is used in the compositions of this invention is not narrowly limited as long as there is a sufficient amount to accelerate the hydrosilylation between (A) and (B) at the desired temperature in the required time (B) in the presence of all other ingredients of the inventive composition. The exact necessary amount of said catalyst component will depend upon the particular catalyst, the amount of other inhibiting compounds and the SiH to olefin ratio and is not easily predictable. However, for platinum catalysts said amount can be as low as possible due to cost reasons. Preferably, one should add more than one part by weight of platinum for every one million parts by weight of the organosilicon components (A) and (B) to ensure curing in the presence of other undefined inhibiting traces. For the compositions of this invention, the amount of platinum containing catalyst component to be applied is preferably sufficient to provide from 1 to 200 ppm preferably 2 to 100 ppm, especially preferred 4 to 60 ppm by weight platinum per weight of polyorganosiloxane components (A) plus (B). Preferably, said amount is at least 4 ppm platinum by weight per sum of (A) and (B).

The hydrosilylation catalyst can also be selected from the group of catalysts capable of being photoactivated. These photo-activatable catalysts preferably contain at least one metal selected from the group composed of Pt, Pd, Rh, Co, Ni, Ir or Ru. The catalysts capable of being photoactivated preferably comprise platinum compounds. Catalyst capable of being photo-activatable is preferably selected among organometallic compounds, i.e. comprise carbon-containing ligands, or salts thereof. In a preferred embodiment, photoactive catalyst (C) has metal carbon bonds, including sigma- and pi-bonds. Preferably, the catalyst capable of being photo-activated (C) is an organometallic complex compound having at least one metal carbon sigma bond, still more preferably a platinum complex compound having preferably one or more sigma-bonded alkyl and/or aryl group, preferably alkyl group(s). Sigma-bonded ligands include in particular, sigma-bonded organic groups, preferably sigma-bonded $C_1$-$C_6$-alkyl, more preferably sigma-bonded methyl groups, sigma-bonded aryl groups, like phenyl, Si and O substituted sigma bonded alkyl or aryl groups, such as triorganosilylalkyl groups, sigma-bonded silyl groups, like trialkyl silyl groups. Most preferred photoactivatable catalysts include $\eta^5$-(optionally substituted)-cyclopentadienyl platinum complex compounds having sigma-bonded ligands, preferably sigma-bonded alkyl ligands.

Further catalysts capable of being photoactivated include ($\eta$-diolefin)-(sigma-aryl)-platinum complexes (see e.g. U.S. Pat. No. 4,530,879).

The catalyst capable of being photoactivated can be used as such or supported on a carrier.

Examples of catalysts capable of being photo-activated include η-diolefin-σ-aryl-platinum complexes, such as disclosed in U.S. Pat. No. 4,530,879, EP 122008, EP 146307 (corresponding to U.S. Pat. No. 4,510,094 and the prior art documents cited therein), or US 2003/0199603, and also platinum compounds whose reactivity can be controlled by way of for example using azodi-carboxylic esters, as disclosed in U.S. Pat. No. 4,640,939 or diketonates.

Platinum compounds capable of being photo-activated that can be used are moreover those selected from the group having ligands selected from diketones, e.g. benzoylacetones or acetylenedicarboxylic esters, and platinum catalysts embedded into photodegradable organic resins. Other Pt-catalysts are mentioned by way of example in U.S. Pat. No. 3,715,334 or U.S. Pat. No. 3,419,593, EP 1 672 031 A1 and Lewis, Colborn, Grade, Bryant, Sumpter, and Scott in *Organometallics*, 1995, 14, 2202-2213, all incorporated by reference here.

Catalysts capable of being photo-activated can also be formed in-situ in the silicone composition to be shaped, by using Pt(0)-olefin complexes and adding appropriate photo-activatable ligands thereto.

The catalysts capable of being photo-activated that can be used here are, however, not restricted to these above-mentioned examples.

The most preferred catalyst capable of being photo-activated to be used in the process of the invention are ($\eta^5$-cyclopentadienyl)-trimethyl-platinum, ($\eta^5$-cyclopentadienyl)-triphenyl-platinum complexes, in particular, ($\eta^5$-methylcyclopentadienyl)-trimethyl-platinum.

The amount of the catalyst capable of being photo-activatable is preferably 1 to 500 ppm and preferably in the same lower range as defined for the heat-activatable hydrosilylation catalysts mentioned above.

The most preferred curable silicone rubber composition according to the invention comprises a hydrosilylation catalyst C) comprising platinum.

Reinforcing Filler D)

The curable silicone rubber composition according to the invention comprises at least one reinforcing filler D) which is preferably selected from at least one, preferably surface-treated, silica filler.

Preferably the reinforcing filler D) is a silica filler which is selected from the group of fumed silica and precipitated silica, having a BET from 50 to 500 m$^2$/g preferably measured according to DIN-ISO 9277 with nitrogen. Most preferably, the reinforcing filler D) is a silica filler selected from a surface-treated filler.

Preferably the surface treatment of the silica filler can be done though reaction with hydrophobes selected from the group of disilazanes, silylamines, silanols, bis(polyorganosiloxanyl)amine of the formula [R$^a$R$^b$R$^c$Si (OSi(Me)$_2$)$_t$]$_2$NH where R$^a$ is methyl, ethyl, or phenyl; R$^b$ is methyl or ethyl, R$^c$ is vinyl or allyl; and t is an integer of from 2 to 12 inclusive, trimethylsilanol, trimethylchlorosilane, trimethylethoxysilane, triorganosilyloxyacylates, such as vinyldimethylacetoxysilane, triorganosilylamines, such as trimethylsilylisopropylamine, trimethylsilylethylamine, dimethylphenylsilylpropylamine and vinyldimethylsilylbutylamine, triorganosilylaminooxy compounds, such as diethylaminooxytrimethylsilane and diethylaminooxydimethylphenylsilane, and additionally hexamethyldisiloxane, 1,3-divinyltetramethyldisiloxane, 1,3-diphenyltetramethyldisiloxane and 1,3-diphenyltetramethyldisilazane.

Other examples of organosilicon compounds are dimethyldichlorosilane, dimethyldiethoxysilane, dimethyldimethoxysilane, diphenyldiethoxysilane, vinylmethyldimethoxysilane, methyltriethoxysilane, octamethylcyclotetrasiloxane and/or dimethylpolysiloxanes having from 2 to 12 siloxane units per molecule and containing a hydroxyl group bonded to Si in each of the terminal units.

Most preferably the reinforcing filler D) is at least one silica filler surface-treated with at least one silazane, preferably an organosilazane, e.g. of the formula R'$_3$S—[NH—SiR'$_2$]$_n$—NH—SiR'$_3$ (with n being ≥0) and R' being an organic group, preferably selected from methyl and/or vinyl. Most preferred are divinyltetramethyldisilazane and hexamethyldisilazane and a mixture thereof.

In a particular preferred embodiment the silica filler is subjected to an extended surface treatment with one or more organosilazanes, which may include a single step treatment for an extended period of time, such as at least 2 or 3 hours, or a multiple step surface-treatment.

In a particular preferred embodiment the surface-treated silica filler, is prepared by the surface-treatment of silica in a two-step process comprising subsequent reaction of said silica with at least two charges of silazanes. Preferably the at least one silica filler is a surface-treated silica filler, which is obtained by the following steps:
  a) providing a mixture comprising the components A), B) and at least one silica filler D),
  b) adding at least one silazane having at least one alkenyl group and at least one silazane which does not have alkenyl groups to said mixture,
  c) heating to at least 100° C. for at least 1 h,
  d) removal of the volatiles, and
  e) further adding at least one silazane which preferably does not have alkenyl groups,
  f) heating to at least 100° C. for at least 1 h, and
  g) removal of the volatiles.

Preferred silica fillers are preferably those known as reinforcing silicas, which also permit production of elastomers having sufficient transparency for irradiation. Preferred are reinforcing silicas, in particular those increasing the strength. Examples are silicas whose BET surface areas are from 50 to 400 m$^2$/g, preferably 80 to 350 m$^2$/g preferably measured according to DIN-ISO 9277 with nitrogen, in particular, fumed or precipitated silicas.

Preferably, these fillers are surface-hydrophobicized. The amount of reinforcing filler D) is preferably from 1 to 100 parts by weight, more preferably from 5 to 90 parts by weight, even more preferably from 10 to 80 parts by weight, even more preferably from 15 to 70 parts by weight based on 100 parts by weight of the total amounts of components (A) and (B).

Fillers whose BET surface areas are above 50 m$^2$/g permit production of silicone elastomers with improved properties. In view of strength and transparency fumed silicas are preferred, and even more preferred silicas are, for example, Aerosil® 200, 300, HDK® N20 or T30, Cab-O-Sil® MS7 or HS5 having more than 200 m$^2$/g BET surface area. As BET surface area rises, the transparency of the silicone mixtures in which these materials are present also rises. Examples of trade names of the materials known as precipitated silicas, or wet silicas, are Vulkasil®VN3, or FK 160 from Evonik (formerly Degussa), or Nipsil®LP from Nippon Silica K. K. and others.

It is preferred to use silica fillers having BET-surface areas of 50 m$^2$/g or more, preferably having a BET-surface of at least 150 m$^2$/g. Such compositions can be also photo-activated if desired due to sufficient transparency.

The reinforcing filler D) may be subject of any suitable conventional surface-treatment with suitable surface-treatment agents belonging to hydrophobizing treatment with a suitable hydrophobizing agent, dispersing treatment with suitable dispersing agents, which influence the interaction of the filler with the silicone polymer, e.g. influence thickening action. The surface treatment of the fillers is preferably a hydrophobation with silanes or with siloxanes. It can by way of example take place in situ via addition of silazanes, such as hexamethyldisilazane and/or 1,3-divinyltetramethyldisilazane, with addition of water, and 'in-situ'-hydrophobation is preferred. It can also take place with other familiar filler-treatment agents with polyorganosiloxanediols whose chain lengths are from 2 to 50 and which bear unsaturated organic radicals, with the aim of providing reactive sites for the crosslinking reaction.

Examples of commercially available silicas pre-hydrophobized with various silanes are: Aerosil® R 972, R 974, R 976, or R 812, or, for example, HDK 2000 or H30 Examples of trade names for materials known as hydrophobized precipitated silicas or wet silicas are e.g. Sipernat D10 or D15 from Evonik (formerly Degussa).

Rheological properties, i.e. technical processing properties, of the non-cured silicone rubber mixtures can be influenced by the selection of the type of the filler, its amount, and the nature of hydrophobization.

Auxiliary Additives G) The curable silicone rubber composition according to the invention comprises optionally up to 100 parts by weight one or more auxiliary additives G). The auxiliary additive G) is different from any of the other components (A1), A2), B), C), D), E), and F)) as defined herein, and is preferably selected from the group consisting of low compression set additives, surface-treating agents, lubricating oils, oil bleeding agents, hydrosilylation inhibitors etc.

The auxiliary additive G) may include in particular:

low compression set additives, such as acetylene alcohols having the formula: H—C≡C—R"—OH, wherein R" is a divalent organic group, preferably a cyclic saturated or unsaturated hydrocarbyl group such as cyclohexane-diyl, fluorene-diyl, e.g. 1-ethynyl-1-cyclohexanol ("ECH"), 9-ethynyl-fluorenol, and the like, preferably ECH and 9-ethynyl-9-fluorenol, most preferably ECH (these compounds act also as hydrosilylation inhibitors), curing retardant or flame retardants such as a triazole compound selected e.g. from the group consisting of 1,2,3-triazole, 1,2,4,-triazole, benzotriazole, 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3,-triazole, 1,2,3-triazole-4-aldehyde, 4-cyano-1,2,3-triazole, 1-methyl-1,2,4-triazole, 1,3-diphenyl-1,2,4-triazole, 5-amino-3-methyl-1,2,4-triazole, 3-mercapto-1,2,4-triazole, 1-phenyl-1,2,4-triazole-5-one, 1-phenylurazole, 1-methylbenzotriazole, 5,6-dimethyl-benzotriazole, 2-phenylbenzotriazole, 1-hydroxyben-zotriazole and methyl 1-benzotriazolecarboxylate, a metal salt, carbon black, phthalocyanine compounds or metal derivatives of said compound where said metal is selected from the group consisting of copper, nickel, cobalt, iron, chromium, zinc, platinum, palladium, vanadium.

surface-treating agents,
lubricating oils,
oil bleeding agents,
hydrosilylation inhibitors,
coloring agents or pigments, such as inorganic pigments, and organic dyes,
adhesion promoters,
stabilizers, such as heat stabilizers,
fillers, such as reinforcing and non-reinforcing fillers, such as quartz powder and diatomaceous earth, calcium carbonate,
dispersants,
flow improvers,
plasticizers,
slip agents,
toughening agents,
conductive stability improvers, such as carbon black or graphite, and
foam forming additives, e.g. alcohols,
anti-oxidants,
thixotropic agents,
foam stabilizers,
ultraviolet stabilizers, and
water which may be used in the preparation of the curable silicone rubber compositions.

In a preferred embodiment of the invention the curable silicone rubber composition does not comprise quartz.

In a preferred embodiment of the invention the curable silicone rubber composition comprises at least one hydrosilylation inhibitor, preferably 1-ethynyl-1-cyclohexanol ("ECH").

In a preferred embodiment of the invention, the curable silicone rubber composition comprises at least one coloring agent or pigment. Such coloring agents or pigment are not colourless, like for example the preferred colourless metal oxides comprised by component F), and may include inorganic pigments, and organic dyes. In this respect, the curable silicone rubber composition according to the invention can be in particular provided as a colourless curable silicone rubber composition, i.e. which does not comprise any coloring agent or pigment (which do not include of course the colourless metal oxide F)). From such colourless curable silicone rubber compositions according to the invention colored curable silicone rubber compositions can be easily obtained by mixing the colourless curable silicone rubber compositions according to the invention with at least one coloring agent or pigment or the colored metal oxides F) as defined above, such as red iron oxide etc. That is, a colourless curable silicone rubber composition of the invention may serve as a basic composition for obtaining various types of colored curable silicone rubber compositions according to the invention.

Melamine Cyanurate E)

The curable silicone rubber composition according to the invention optionally comprises melamine cyanurate E). Melamine cyanurate, also known as melamine-cyanuric acid adduct or melamine-cyanuric acid complex, is a crystalline complex formed from a 1:1 mixture of melamine and cyanuric acid:

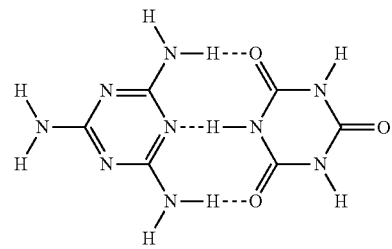

If the curable silicone rubber composition comprises melamine cyanurate E) the amount is preferably less than 5, more preferably less than 2 parts by weight based on 100 parts by weight based on 100 parts by weight of the total amount of components A) and B).

Melamine cyanurate is a well-known flame retardant in plastic industry and widely used e.g. in polyamide or polyvinylchloride compositions. The invention was to transfer the use of the material from the rapid oxidation process of incineration to the slow oxidation process of heat aging under atmospheric conditions. The result was obviously a successful in binding of $O_2$-radicals within the melamine cyanurate structure to avoid the attack on the silicone polymer backbone, thereby surprisingly lowering the compression set of the cured silicone rubber composition of the invention.

Component F): At Least One Metal Compound

The curable silicone rubber composition according to the invention optionally comprises at least one metal compound F), which is preferably selected from metal salts such as colored or colourless metal oxides, except silica.

In a preferred embodiment of the invention the at least one metal compound F) is selected from the group consisting of metal salts, in particular, colorless metal oxides, selected from the group consisting of aluminum oxide, titanium oxide, magnesium oxide, cerium oxide, zirconium oxide, tin oxide and zinc oxide, and mixtures thereof, colored metal oxides, selected from the group consisting of oxides of transition metal compounds and mixtures thereof, such as iron oxide pigments (e.g. yellow iron oxide, red iron oxide, black iron oxide and mixtures thereof), mixed phase metal oxide pigments such as $CoAl_2O_4$ and $Co(Al,Cr)_2O_4$, synthetic and natural ultramarines, and chromic oxides, and mixtures of colorless metal oxides and colored metal oxides.

A preferred colourless metal oxide within the definition of component F) of the present invention shall intend to mean that the oxide has no dyeing or coloring effect. Within the present invention, also a white metal oxide such as $TiO_2$ is a colourless metal oxide. Usually a colourless metal oxide includes white, opaque, translucent, or transparent metal oxides, such as aluminum oxide, titanium oxide, magnesium oxide, cerium oxide, zirconium oxide, tin oxide and zinc oxide, and mixtures thereof. Preferably, the colorless metal oxide F) is selected from the group of titanium oxide and magnesium oxide and mixtures thereof. The colored metal oxides, are preferably selected from the group consisting of oxides of transition metal compounds and mixtures thereof, such as iron oxide pigments (e.g. yellow iron oxide, red iron oxide, black iron oxide and mixtures thereof), mixed phase metal oxide pigments such as $CoAl_2O_4$ and $Co(Al,Cr)_2O_4$, synthetic and natural ultramarines, and chromic oxides. In a preferred embodiment the curable silicone rubber composition according to the invention comprises mixtures of colorless metal oxides and colored metal oxides, preferably a mixture of at least one of aluminum oxide, titanium oxide, magnesium oxide, cerium oxide, zirconium oxide, tin oxide and zinc oxide, and at least one iron oxide pigment.

The curable silicone rubber composition comprises the at least one metal compound, preferably the at least one colourless metal oxide preferably in an amount of 0.01 to 10, preferably 0.1 to 5 parts by weight based on 100 parts by weight of the total amount of the components A) and B). In a preferred embodiment the amount of the at least one metal compound is less than 2, preferably less than 1.9, preferably less than 1.8, preferably less than 1.7, preferably less than 1.6, preferably less than 1.5 percent by weight, based on the total composition of the curable silicone rubber composition, or the cured composition thereof.

The $TiO_2$ preferably used is a fine dispersed metal oxide with large specific surface. This allows the material to be active for catalytic processes, which makes it useful as a heat stabilizer in elastomers. In addition, the additive, which appears whitish, can be over pigmented with other colors such as the above mentioned colored metal oxides or the coloring agents or pigments mentioned for component G) above.

In a preferred embodiment the curable silicone rubber composition according to the invention does not comprise calcium hydroxide, preferably the curable silicone rubber composition according to the invention does not comprise alkaline and earth alkaline metal hydroxides.

In a preferred embodiment, the curable silicone rubber composition of the invention satisfies one or more, preferably two or more of the following requirements a) to c), preferably in order to provide further improvements in compression set:
  a) the molar ratio of all SiH groups to all groups $SiR^1$ in the composition (or short: the molar ratio of the SiH groups to the groups $SiR^1$) is ≤3, preferably ≤2, more preferably between 1.0 and 1.8; and
  b) the key impact factor KpSiH in mmol/g as defined below is between 2.5 to 17.5 mmol/g; preferably 2.5 to 15 mmol/g;

$$KpSiH = \sum_i \left\{ [\text{Parts } B_i * SiH \text{ of } B_i] * (1 - P_i(D^*D^*)) * \left(1 - \frac{2}{SiH(B_i)*(1-P_i(D^*D^*))}\right) \right\} * \frac{1}{\frac{SiH}{SiR^1}}$$

wherein
  "parts $B_i$" are the weight percentages of the i-th component B) based on the total weight of the composition,
  "SiH of $B_i$" is the SiH-content of the i-th component B) in mmol/gram,
  "$SiH(B_i)$" is the number of SiH-groups in the i-th component B) per molecule,
  "$SiH/SiR^1$" is as defined under item a) above, $$P_i(D^*D^*) = \left[\frac{\text{mol number of } D^* \text{ groups}}{\text{mol number of groups } (D^* + D + M + M^*)}\right]^2$$

wherein
  D is $R_2SiO_{2/2}$ in component B),
  M is $R_3SiO_{1/2}$ in component B),
  D* is $HRSiO_{2/2}$ in component B),
  M*=$HR_2SiO_{1/2}$ in component B), wherein R is as defined above, and
  $P_i$ (D*D*) for each respective i-th component B), having the required units, is preferably 0 to 1, more preferably 0 to 0.9, most preferably 0 to 0.85,
  c) the molar ratio of the alkenyl groups $R^1$ in component A2) to the alkenyl groups in component A1) is in the range of 0.3 to 8, preferably 0.6 to 6, more preferably 1 to 5.

The present inventors found that if the parameter KpSiH is in the preferred range of 2.5 to 17.5, preferably 2.5 to 15, more preferably 2.5 to 13, and still more preferably 3.5 to 12, particularly low compression sets are achieved. It should be noted that if the composition contains only organohydrogensiloxanes having only terminal SiH groups, i.e. the number of SiH-groups in component B) per molecule is two, KpSiH becomes zero, that is, this embodiment is less preferred, inter alia because the mechanical properties of the cured compositions can become inferior.

For higher KpSiH, such as of above 17.5, the mechanical properties of the silicone rubber will become worse. For KpSiH values below 2.5, similarly the mechanical properties of the silicone rubber will become worse.

In a most preferred embodiment the curable silicone rubber composition of the invention satisfies one, preferably two or more, or all of the following requirements a) to f), preferably in order to provide further improvements in compression set:
  a) the molar ratio of all SiH groups to all groups $SiR^1$ in the composition (or short: the molar ratio of the SiH groups to the groups $SiR^1$) is ≤3, preferably ≤2, more preferably between 1.0 and 1.8; and
  b) the key impact factor KpSiH in mmol/g as defined above is between 2.5 to 17.5 mmol/g; preferably 2.5 to 15 mmol/g;
  c) the molar ratio of the alkenyl groups $R^1$ in component A2) to the alkenyl groups in component A1) is in the range of 0.3 to 8, preferably 0.6 to 6, more preferably 1 to 5, d) the silica filler is subjected to an extended surface treatment with one or more organosilazanes, which may include a single step treatment for an extended period of time, such as at least 2 or 3 hours, or a multiple step surface-treatment, in particular, a two-step process comprising the subsequent reaction of said silica with at least two charges of silazanes in particular as described before, e) the curable silicone rubber composition comprises one or more triazole compounds, and f) the curable silicone rubber composition comprises at least one resin based organohydrogensiloxane comprising at least one unit selected from T, T* and Q, preferably Q such as those described above.

The present invention further relates to cured silicone rubber compositions obtained by curing the curable silicone rubber composition according to the invention.

The cured silicone rubber compositions of the invention exhibit very low compression sets such as a compression set of 30 percent or less, preferably 25 percent or less, more preferably 20 percent or less, after testing at 175° C. for 144 hours, or 50 percent or less, preferably 40 percent or less, after testing at 175° C. for 1000 hours.

In the present invention the measurement of compression sets of the cured silicone rubber compositions are carried out in accordance with INTERNATIONAL STANDARD ISO 815-1 First edition 2008-02-01 with the following settings:

4.5 Timing device: a) example 1
5 Test pieces
   5.1 Dimensions: Type A: a cylindrical disc of diameter 29 mm±0.5 mm and thickness 12,5 mm±0.5 mm
   5.2 Preparation: The test pieces are prepared by moulding each disc.
   5.3 A minimum of three test pieces is tested.
6 Test conditions:
   6.1 Duration of test 144 hours and 1000 hours
   6.2 Temperature of test 175° C.±2° C.
7.3 Applying the compression
The applied compression is (25±2) % of the original thickness of the test piece.

In a preferred embodiment of the invention the curable silicone rubber composition comprises:
100 parts by weight of the total of components A1) and A2),
0.01 to 100 parts by weight of component B)
0.5 to 1000, preferably 1 to 100 ppm of component C) based on the weight amount of the transition metal and based on the total weight of components A) and B),
0.01 to 100 parts by weight, preferably 10 to 100 parts by weight of component D) based on 100 parts by weight of the total amount of components A) and B).
0 to 5 parts by weight of component E), preferably in an amount of less than 5, more preferably less than 2 parts by weight based on 100 parts by weight of the total amount of components A) and B), preferably >0 and less than 5 parts by weight, more preferably less than 2 parts by weight, even more preferably 0.01 to 2 parts by weight of component E) based on 100 parts by weight of the total amount of the components A) and B),
0 to 10 parts by weight of component F) based on 100 parts by weight of the total amount of components A) and B), preferably >0 to 10, more preferably 0.01 to 10, even more preferably 0.1 to 5 parts by weight of component F) based on 100 parts by weight of the total amount of the components A) and B), and
0 to 100 parts by weight of component G) based on 100 parts by weight of the total amount of components A) and B),
wherein components A) to G) are each as defined above.

In a preferred embodiment the curable silicone rubber composition of the invention comprises less than 40 parts of the sum of the amounts of D), E) and F) based on 100 parts of the total of components A) and B). Preferably the curable silicone rubber composition of the invention comprises more than 1, preferably more than 2 parts of the sum of the amounts of D), E) and F) based on 100 parts of the total of components A) and B).

In a preferred embodiment the curable silicone rubber composition of the invention comprises D), E) and F).

The present invention further relates to cured silicone rubber compositions obtained by curing the curable silicone rubber composition according to the invention.

The cured silicone rubber compositions of the invention exhibit very low compression sets such as a compression set of 10 percent or less after testing at 175° C. for 22 hours, or 20 percent or less after testing at 175° C. for 144 hours, or 40 percent or less after testing at 175° C. for 1000 hours.

Accordingly, the curable silicone rubber composition of the invention can be used in particular for the manufacture of automotive parts such as a connector seals, electrical and electronic parts, packaging parts, construction parts such as sealants, household parts, and gasket sealants. Most preferred the curable silicone rubber compositions of the invention are used, in particular, for the manufacture of sealed connector assemblies in particular for automotive applications.

PREFERRED EMBODIMENTS OF THE INVENTION

In the following the preferred embodiments of the invention are summarized:

Embodiments

1. Curable silicone rubber compositions, which are curable to vulcanize to a cured composition having at least one compression set value, selected from the group of the following compression sets: 30 percent or less, preferably 25 percent or less, more preferably 20 percent or less after testing at 175° C. for 144 hours, and 50 percent or less, preferably 40 percent or less after testing at 175° C. for 1000 hours, comprising:
  A) 100 parts by weight of at least one polyorganosiloxane having at least one alkenyl group $R^1$, as defined above,
  B) 0.01 to 100 parts by weight of at least one organohydrogensiloxane having at least two SiH groups, as defined above,
  C) at least one transition metal catalyst,
  D) 0.01 to 100 parts by weight of at least one reinforcing filler with a BET surface area of at least 50 $m^2/g$, and
  G) optionally up to 100 parts by weight one or more auxiliary additives,
  and wherein the composition satisfies one, preferably two or more of the following requirements a) to c):
  a) the molar ratio of all SiH groups to all groups $SiR^1$ (wherein $R^1$ is as defined above) in the composition (or short: the molar ratio of the SiH groups to the groups $SiR^1$) is ≤3, preferably ≤2, more preferably between 1.0 and 1.8; and b) the key impact factor KpSiH in mmol/g as defined below is between 2.5 to 17.5 mmol/g; preferably 2.5 to 15 mmol/g;

$$KpSiH = \sum_i \left\{ [\text{Parts } B_i * SiH \text{ of } B_i] * \right.$$
$$\left. (1 - P_i(D^*D^*)) * \left(1 - \frac{2}{SiH(B_i)*(1-P_i(D^*D^*))}\right) \right\} * \frac{1}{\frac{SiH}{SiR^1}}$$

wherein
"parts $B_i$" are the weight percentages of the i-th component B) based on the total weight of the composition,
"SiH of $B_i$" is the SiH-content of the i-th component B) in mmol/gram,
"SiH($B_i$)" is the number of SiH-groups in the i-th component B) per molecule,
"SiH/SiR$^1$" is as defined under item a) above, $$P_i(D^*D^*) = \left[\frac{\text{mol number of } D^* \text{ groups}}{\text{mol number of groups } (D^* + D + M + M^*)}\right]^2$$

wherein
D is $R_2SiO_{2/2}$ in component B),
M is $R_3SiO_{1/2}$ in component B),
D* is $HRSiO_{2/2}$ in component B),
M*=$HR_2SiO_{1/2}$ in component B), wherein R is as defined above, and
$P_i(D^*D^*)$ for each respective i-th component B), having the required units, is preferably 0 to 1, more preferably 0 to 0.9, most preferably 0 to 0.85,
c) the molar ratio of the alkenyl groups $R^1$ in component A2) to the alkenyl groups $R^1$ in component A1) is in the range of 0.3 to 8, preferably 0.6 to 6, more preferably 1 to 5.

2. Curable silicone rubber composition according to according embodiment 1, wherein the at least one reinforcing filler D) is selected from at least one, preferably surface-treated, silica filler, preferably the at least one reinforcing filler D) is selected from the group of fumed silica, precipitated silica, and a surface-treated filler having a BET from 50 to 500 m$^2$/g.

3. Curable silicone rubber composition, according to any of the previous embodiments, comprising component F), which is at least one metal compound, preferably selected from metal salts such as colored or colourless metal oxides, except silica, and preferably the at least one metal compound F) is selected from the group consisting of: colorless metal oxides, preferably selected from the group consisting of aluminum oxide, titanium oxide, magnesium oxide, cerium oxide, zirconium oxide, tin oxide and zinc oxide, and mixtures thereof, colored metal oxides, preferably selected from the group consisting of oxides of transition metal compounds and mixtures thereof, such as iron oxide pigments (e.g. yellow iron oxide, red iron oxide, black iron oxide and mixtures thereof), mixed phase metal oxide pigments such as CoAl$_2$O$_4$ and Co(Al,Cr)$_2$O$_4$, synthetic and natural ultramarines, and chromic oxides, and mixtures of said colorless metal oxides and said colored metal oxides.

4. Curable silicone rubber composition, according to any of the previous embodiments, comprising component E), which is melamine cyanurate.

5. Curable silicone rubber composition, according to any of the previous embodiments, comprising at least one metal compound F) as defined in embodiment 3 and E) melamine cyanurate.

6. Curable silicone rubber composition according to any of the previous embodiments, which does not comprise calcium hydroxide, preferably the curable silicone rubber composition according to the invention does not comprise alkaline and earth alkaline metal hydroxides.

7. Curable silicone rubber composition, according to any of the previous embodiments, wherein the molar ratio of the alkenyl groups $R^1$ in component A2) to the alkenyl groups in component A1) is in the range of 0.3 to 8, preferably 0.6 to 6, more preferably 1 to 5.

8. Curable silicone rubber composition, according to any of the previous embodiments, comprising component E), melamine cyanurate, in an amount of less than 5 preferably less than 2 parts by weight based on 100 parts by weight of the total amount of components A) and B).

9. The curable silicone rubber composition according to any of the previous embodiments, wherein the organohydrogensiloxane B) is selected from the group of B1) a resin based organohydrogensiloxane having >2 terminal SiH groups and B2) an organohydrogensiloxane having 2 or more SiH groups and being different from B1).

10. The curable silicone rubber composition according to any of the previous embodiments, wherein the organohydrogensiloxane B) comprises at least two different organohydrogensiloxanes.

11. The curable silicone rubber composition according to any of the previous embodiments, wherein the transition metal catalyst C) is selected from hydrosilylation catalysts comprising at least one metal selected from the group consisting of platinum, rhodium, palladium, ruthenium and iridium.

12. The curable silicone rubber composition according to any of the previous embodiments wherein the hydrosilylation catalyst C) comprises platinum.

13. The curable silicone rubber composition according to any of the preceding embodiments, wherein the reinforcing filler D) is selected from the group of fumed silica and precipitated silica, having a BET from 50 to 500 m$^2$/g.

14. The curable silicone rubber composition according to any of the preceding embodiments, wherein the at least one reinforcing filler D) is selected from a surface-treated filler.

15. The curable silicone rubber composition according to any of the preceding embodiments, wherein the at least one reinforcing filler D) is a silica filler surface-treated with at least one silazane.

16. The curable silicone rubber composition according to any of the preceding embodiments, wherein the at least one reinforcing filler D) is a surface-treated silica filler, which is surface-treated in a two-step process comprising subsequent reaction of said filler with at least two charges of silazanes.

17. The curable silicone rubber composition according to any of the preceding embodiments, wherein the at least one reinforcing filler D) is a surface-treated silica filler, which is obtained by the following steps:
a) providing a mixture comprising the components A), B) and at least one silica filler D),
b) adding at least one silazane having at least one alkenyl group and at least one silazane which does not have alkenyl groups to said mixture,
c) heating to at least 100° C. for at least 1 h,
d) removal of the volatiles, and
e) further adding at least one silazane which preferably does not have alkenyl groups, f) heating to at least 100° C. for at least 1 h, and
g) removal of the volatiles.

18. The curable silicone rubber composition according to any of the preceding embodiments, wherein the at least one metal compound F) is selected from the group consisting of:
  colorless metal oxides, preferably selected from the group consisting of aluminum oxide, titanium oxide, magnesium oxide, cerium oxide, zirconium oxide, tin oxide and zinc oxide, and mixtures thereof,
  colored metal oxides, preferably selected from the group consisting of oxides of transition metal compounds and mixtures thereof, such as iron oxide pigments (e.g. yellow iron oxide, red iron oxide, black iron oxide and mixtures thereof), mixed phase metal oxide pigments such as $CoAl_2O_4$ and $Co(Al,Cr)_2O_4$, synthetic and natural ultramarines, and chromic oxides, and
  mixtures of said colorless metal oxides and said colored metal oxides.

19. The curable silicone rubber composition according to any of the preceding embodiments, wherein the at least one metal compound F) is selected from the group of titanium oxide and magnesium oxide.

20. The curable silicone rubber composition according to any of the preceding embodiments, which comprises at least one auxiliary additive G), which are different from any of the other components (A1) to F)) as defined above, and are selected from the group consisting of low compression set additives, surface-treating agents, lubricating oils, oil bleeding agents, hydrosilylation inhibitors.

21. The curable silicone rubber composition according to any of the preceding embodiments, which comprises at least one auxiliary additive G) selected from the group consisting of a low compression set additive selected from acetylene alcohols having the formula:
  H—C≡C—R″—OH, wherein R″ is an organic group, e.g. 1-ethynyl-1-cyclohexanol ("ECH"), 9-ethynyl-9-fluorenol, and a curing retardant or flame retardant selected from a triazole compound.

22. The curable silicone rubber composition according to any of the preceding embodiments, which comprises at least one auxiliary additive G), selected from triazole compounds.

23. The curable silicone rubber composition according to any of the preceding embodiments, comprising:
  100 parts by weight of the total of components A1) and A2),
  0.01 to 100 parts by weight of component B), preferably 0.01 to 50 parts by weight of component B),
  0.5 to 1000, preferably 1 to 100 ppm of component C) based on the weight amount of the transition metal and based on the total weight of components A) and B),
  0.01 to 100 parts by weight, preferably 10 to 100 parts by weight of component D) based on 100 parts by weight of the total amount of components A) and B).
  0 to 5 parts by weight of component E), preferably in an amount of less than 5, more preferably less than 2 parts by weight based on 100 parts by weight of the total amount of components A) and B), preferably >0 and less than 5 parts by weight, preferably less than 2 parts by weight, more preferably 0.01 to 2 parts by weight of component E) based on 100 parts by weight of the total amount of the components A) and B),
  0 to 10 parts by weight of component F) based on 100 parts by weight of the total amount of components A) and B), preferably >0 to 10, more preferably 0.01 to 10, even more preferably 0.1 to 5 parts by weight of component F) based on 100 parts by weight of the total amount of the components A) and B), and
  0 to 100 parts by weight of component G) based on 100 parts by weight of the total amount of components A) and B),
  wherein components A) to G) are each as defined above.

24. The curable silicone rubber composition according to any of the preceding embodiments, comprising less than 40 parts of the sum of the total amounts of components D), E) and F), as defined above, based on 100 parts of the total amount of components A) and B), as defined above.

25. The curable silicone rubber composition according to any of the preceding embodiments, wherein the molar ratio of all SiH groups to all groups $SiR^1$ in the composition (or short: the molar ratio of the SiH groups to the groups $SiR^1$) is ≤3, preferably ≤2, more preferably between 1.0 and 1.8.

26. Curable silicone rubber composition, comprising:
  Component A), which comprises at least one of component A1), and at least one of component A2), which are defined as follows:
  A1) at least one polyorganosiloxane of the formula (Ia),

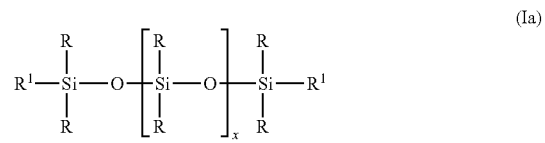

(Ia)

wherein each R is independently selected from saturated or aromatic organic groups, each $R^1$ is independently selected from alkenyl groups, and x is ≥0,
  A2) at least one polyorganosiloxane of the formula (Ib),

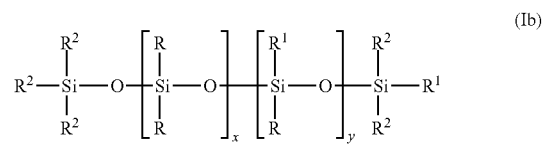

(Ib)

wherein x, R and $R^1$ are as defined above; $R^2$ is selected from the group consisting of R and $R^1$, and y is ≥1,
  B) at least one organohydrogensiloxane having at least two SiH groups, as defined above;
  C) at least one transition metal catalyst;
  D) at least one silica filler, as defined above;
  E) melamine cyanurate;
  F) at least one metal compound, preferably selected from metal salts such as colored or colourless metal oxides, except silica,
  G) optionally one or more auxiliary additives,
  wherein the molar ratio of the SiH groups to the groups $SiR^1$ is ≤3, preferably ≤2, more preferably between 1.0 and 1.8.

27. Curable silicone rubber composition, according to embodiment 26, wherein the molar ratio of the alkenyl groups $R^1$ in component A2) to the alkenyl groups $R^1$ in component A1) is in the range of 0.3 to 8, preferably 0.6 to 6, more preferably 1 to 5.

28. Curable silicone rubber composition, according to embodiments 26 or 27, comprising melamine cyanurate E) in an amount of less than 5 parts by weight, preferably less than 2 parts by weight based on 100 parts by weight of the total amount of the components A) and B), further preferably in an amount of >0 and less than 5 parts by weight, more preferably less than 2 parts by weight, even more preferably 0.01 to 2 parts by weight of component E) based on 100 parts by weight of the total amount of the components A) and B).

29. The curable silicone rubber composition according to the previous embodiments 26 to 28, wherein the organohydrogensiloxane B) is selected from the group consisting of B1) a resin based organohydrogensiloxane having >2 terminal SiH groups and B2) a organohydrogensiloxane having 2 or more SiH groups and being different from B1).

30. The curable silicone rubber composition according to the previous embodiments 26 to 29, wherein the organohydrogensiloxane B) comprises at least two different organohydrogensiloxanes.

31. The curable silicone rubber composition according to the previous embodiments 26 to 30, wherein the transition metal catalyst C) is selected from hydrosilylation catalysts comprising at least one metal selected from the group consisting of platinum, rhodium, palladium, ruthenium and iridium.

32. The curable silicone rubber composition according to the previous embodiments 26 to 31, wherein the hydrosilylation catalyst C) comprises platinum.

33. The curable silicone rubber composition according to the previous embodiments 26 to 32, wherein the silica filler D) is selected from the group of fumed silica and precipitated silica, having a BET from 50 to 500 m$^2$/g.

34. The curable silicone rubber composition according to the previous embodiments 26 to 33, wherein the silica filler D) is selected from a surface-treated filler.

35. The curable silicone rubber composition according to the previous embodiments 26 to 34, wherein the at least one silica filler is a silica filler surface-treated with at least one silazane.

36. The curable silicone rubber composition according to the previous embodiments 26 to 35, wherein the at least one silica filler is a surface-treated silica filler, which is surface-treated in a two-step process comprising subsequent reaction of said filler with at least two charges of silazanes.

37. The curable silicone rubber composition according to the previous embodiments 26 to 36, wherein the at least one silica filler is a surface-treated silica filler, which is obtained by the following steps:
   a) providing a mixture comprising the components A), B) and at least one silica filler D),
   b) adding at least one silazane having at least one alkenyl group and at least one silazane which does not have alkenyl groups to said mixture,
   c) heating to at least 100° C. for at least 1 h,
   d) removal of the volatiles, and
   e) further adding at least one silazane which preferably does not have alkenyl groups,
   f) heating to at least 100° C. for at least 1 h, and
   g) removal of the volatiles.

38. The curable silicone rubber composition to the previous embodiments 26 to 37, wherein the at least one metal compound F) is selected from the group consisting of colorless metal oxides, selected from the group consisting of aluminum oxide, titanium oxide, magnesium oxide, cerium oxide, zirconium oxide, tin oxide and zinc oxide, and mixtures thereof,
   colored metal oxides, selected from the group consisting of oxides of transition metal compounds and mixtures thereof, such as iron oxide pigments (e.g. yellow iron oxide, red iron oxide, black iron oxide and mixtures thereof), mixed phase metal oxide pigments such as CoAl$_2$O$_4$ and Co(Al,Cr)$_2$O$_4$, synthetic and natural ultramarines, and chromic oxides, and mixtures of colorless metal oxides and colored metal oxides.

39. The curable silicone rubber composition according to the previous embodiments 26 to 38, wherein the colorless metal oxide F) is selected from the group of titanium oxide and magnesium oxide, and wherein the colored metal oxides are selected from iron oxide pigments.

40. The curable silicone rubber composition according to the previous embodiments 26 to 39, which comprises at least one auxiliary additive G), selected from the group consisting of low compression set additives different from components A1) to F), surface-treating agents, lubricating oils, oil bleeding agents, hydrosilylation inhibitors.

41. The curable silicone rubber composition according to the previous embodiments 26 to 40, which comprises at least one auxiliary additive G) selected from the group consisting of a low compression set additive selected from acetylene alcohols having the formula: H—C≡C—R"—OH, wherein R" is an organic group, e.g. 1-ethynyl-1-cyclohexanol ("ECH"), 9-ethynyl-9-fluorenol, and a curing retardant or flame retardant selected from a triazole compound.

42. The curable silicone rubber composition according to the previous embodiments 26 to 41, comprising:
   100 parts by weight of the total of components A1) and A2),
   0.01 to 100 parts by weight of component B), preferably 0.01 to 50 parts by weight,
   0.5 to 1000, preferably 1 to 100 ppm of component C) based on the weight amount of the transition metal and based on the total weight of components A) and B),
   0.01 to 100 parts by weight of component D), based on 100 parts by weight of the total amount of the components A) and B),
   0.01 to 2 parts by weight of component E), based on 100 parts by weight of the total amount of the components A) and B),
   0.01 to 10 parts by weight of component F), and based on 100 parts by weight of the total amount of the components A) and B),
   0 to 100 parts by weight of component G) based on 100 parts by weight of the total amount of the components A) and B).

43. The curable silicone rubber composition according to any of the previous embodiments, comprising less than 40 parts of the sum of the amounts of D), E) and (F) based on 100 parts of the total of components A) and B).

44. Cured silicone rubber composition obtained by curing the curable silicone rubber composition according to any of the previous embodiments.

45. Cured silicone rubber composition according to any of the previous embodiments having a compression set of 30 percent or less, preferably 25 percent or less, more preferably 20 percent or less, after testing at 175° C. for 144 hours, or 50 percent or less, preferably 40 percent or less, after testing at 175° C. for 1000 hours.

46. Cured silicone rubber composition according to any of the previous embodiments having a compression set value of 50 percent or less preferably 40 percent or less after testing at 175° C. for 1000 hours.

47. Curable silicone rubber compositions, which are curable to vulcanize to a cured composition having at least one compression set value, selected from the group of the following compression sets: 30 percent or less, preferably 25 percent or less, more preferably 20 percent or less, after testing at 175° C. for 144 hours, and 50 percent or less, preferably 40 percent or less, after testing at 175° C. for 1000 hours, which compositions comprise:

Component A*): 100 parts by weight of at least one polyorganosiloxane having at least one alkenyl group, wherein Component A*) is preferably defined as Component A) above, Component B*): 0.01 to 100 parts by weight of at least one organohydrogensiloxane having at least two SiH groups, wherein Component B*) is preferably defined as Component B) above, Component C*): at least one transition metal catalyst, wherein Component C*) is preferably defined as component C) above, Component D*): 0.01 to 100 parts by weight of reinforcing filler with a BET surface area of at least 50 m$^2$/g, wherein Component D*) is preferably defined as component D) above, and Component H): optionally up to 100 parts by weight of one or more components selected from components E) to G) each as defined above, preferably Component H) is comprising or consisting of:
  E) melamine cyanurate as defined above;
  F) at least one metal compound, preferably selected from metal salts such as colored or colourless metal oxides, except silica, as defined above and
  G) optionally one or more auxiliary additives as defined above.

48. Use of the curable silicone rubber composition of any of the preceding embodiments or cured silicone rubber composition of any of the preceding embodiments for the manufacture the manufacture of automotive parts, such as a connector seals; electrical and electronic parts; packaging parts; construction parts such as sealants; household parts; and gasket sealants, most preferred for the manufacture sealed connector assemblies in particular for automotive applications.

EXAMPLES

All parts are weight parts unless otherwise indicated. All percentages are weight percentages unless otherwise indicated.

Example 1

A curable silicone rubber composition according to the invention was prepared according to the following process:
Preparation of Part A)
In a dissolver mixer 17.66 parts of a dimethylvinylsiloxy-terminated polydimethylsiloxane (component A1)) having a viscosity of 10 Pa·s (U10) and 29.88 parts of a dimethylvinylsiloxy-terminated polydimethylsiloxane having a viscosity of 65 Pa·s (U65) (component A1)) were mixed with 5.09 parts of hexamethyldisilazane (surface treating agent—part of component D)), 0.22 parts of divinyltetramethyldisilazane (surface treating agent—part of component D)) and 1.92 parts of water (additive—component G)). The mixture was then mixed with 25.12 parts of fumed silica having a Brunauer-Emmett-Teller (BET) specific surface area of 300 m$^2$/g (Aerosil® 300 from Evonik) (component D)) and heated at 100° C. for 1 h so that a silica filler with a mixture of trimethylsilyl- and vinyldimethylsilyl groups at its surface was formed. Water and resulting volatile compounds from the surface treatment reaction were subsequently removed from the silicone mixture at ca. 150° C. under vacuum (<80 mbar) for 1 h.

As second treatment step 1.31 parts of hexamethyldisilazane (part of component D)) were added again to the mixture and was heated to 100° C. for another 30 minutes. Resulting volatiles were removed from the silicone mixture at ca. 150° C. under vacuum (<80 mbar) for 1 h.

The mixture was later cooled down and diluted with 16.77 parts of Silopren* U10 and 2.04 parts PH 300 (phenylsiloxane lubrication oil—component G).

Subsequently 4 parts of a dimethylvinylsiloxy-terminated poly(dimethylsiloxane-co-methylvinylsiloxane) having a vinyl content of 0.85 mmol/g and a viscosity of 5 Pa·s (V5000—component A2)) and 2 parts of a dimethylvinylsiloxy-terminated poly(dimethylsiloxane-co-methylvinylsiloxane) having a vinyl content of 2.08 mmol/g and a viscosity of 2 Pa·s (V200—component A2)) is added. Finally 0.93 parts of a solution of a Pt$^0$ complex with tetramethyl-tetravinylcyclotetrasiloxane that contains 2 wt % Pt was added (Ashby catalyst).

Finally, 5 parts of a melamine cyanurate color paste CP1 (40 wt.-% melamine cyanurate and 60 wt.-% U10 (dimethylvinylsiloxy-terminated polydimethylsiloxane (component A1)) having a viscosity of 10 Pa·s), and 4 parts of the color paste CP2 (derived from 61.2 parts U10 (dimethylvinylsiloxy-terminated polydimethylsiloxane (component A1)), 37.6 parts titanium dioxide, and 1.1 parts melamine cyanurate) were added to the mixture.

Preparation of Part B)
In a dissolver mixer 17.58 parts of dimethylvinylsiloxy-terminated polydimethylsiloxane having a viscosity of 10 Pa·s (U10) (component A1)) and 31.62 parts of dimethylvinylsiloxy-terminated polydimethylsiloxane having a viscosity of 65 Pa·s (U65) (component A1)) were mixed with 4.88 parts of hexamethyldisilazane (part of component D)), 0.21 parts of divinyltetramethyldisilazane (part of component D)), 0.34 parts of triazole (25 wt-% solution in water) (component G)) and 1.85 parts of water (component G)). The mixture was then mixed with 24.27 parts of fumed silica having a Brunauer-Emmett-Teller (BET) specific surface area of 300 m$^2$/g (Aerosil® 300 from Evonik) (component D)) and heated at 100° C. for 1 h so that a silica filler with a mixture of trimethylsilyl- and vinyldimethylsilyl groups at its surface was formed. Water and resulting volatile compounds from the silylation reaction were subsequently removed from the silicone mixture at ca. 150° C. under vacuum (<80 mbar) for 1 h.

As second treatment step 1.33 parts of hexamethyldisilazane (part of component D)) were added again to the mixture and was heated to 100° C. for another 30 minutes. Resulting volatiles were removed from the silicone mixture at ca. 150° C. under vacuum (<80 mbar) for 1 h.

The mixture was later cooled down and diluted with 15.86 parts of Silopren* U10 (component A1)) and 2.06 parts PH 300 (phenylsiloxane lubrication oil—component G)). Subsequently 5 parts of a dimethylvinylsiloxy-terminated poly(dimethylsiloxane-co-methylvinylsiloxane) having a vinyl content of 0.85 mmol/g and a viscosity of 5 Pa·s (V5000—component A2)), and 2 parts of a dimethylvinylsiloxy-terminated poly(dimethylsiloxane-co-methylvinylsiloxane) having a vinyl content of 2.08 mmol/g and a viscosity of 2 Pa·s (V200—component A2) was added. Finally, 0.5 parts of a dimethylhydrosilyl-terminated poly(dimethylsiloxane) having an SiH content of 1.43 mmol/g and a viscosity of 0.014 Pa·s (component B)), 3 parts of a resin crosslinker with an SiH content at 9.15 mmol/g and a viscosity of 0.03 Pa·s (—component B)), and 0.11 part of 1-ethynyl-1-cyclohexanol (component G))) were added.

Cured silicone rubber compositions according to the invention were prepared as follows: Parts A and B were mixed in a 1:1 weight ratio and cured by heating to 175° C. for 10 minutes.

The molar ratio of SiH to Si-vinyl in the total of the composition (Parts A and B) was 1.23. Measurement of compression sets of the cured silicone rubber compositions were carried out in accordance with DIN ISO 815-1 as described above.

Table 1 summarizes the composition of example 1:

TABLE 1

| Compound | Component | Concentration mmol/g (per component*) | PARTS A | PARTS B |
|---|---|---|---|---|
| U 10 dimethylvinylsiloxy-terminated polydimethylsiloxane having a viscosity of 10 Pa · s | A1) | 0.05 (Si-Vinyl) | 17.66 | 17.58 |
| U 65 dimethylvinylsiloxy-terminated polydimethylsiloxane having a viscosity of 65 Pa · s | A1) | 0.03 (Si-Vinyl) | 29.88 | 31.62 |
| Water | G) | | 1.92 | 1.85 |
| Divinyltetramethyldisilazane | D) | 10.8 (Si-Vinyl) | 0.22 | 0.21 |
| Hexamethyldisilazane | D) | | 5.09 | 4.88 |
| triazole (25% in water) | G) | | — | 0.34 |
| Aerosil 300 | D) | | 25.12 | 24.27 |
| Hexamethyldisilazane ($2^{nd}$ filler treatment step) | D) | | 1.31 | 1.33 |
| U 10 dimethylvinylsiloxy-terminated polydimethylsiloxane having a viscosity of 10 Pa · s | A1) | 0.05 (Si-Vinyl) | 16.77 | 15.86 |
| PH 300/PH LSR | G) | | 2.04 | 2.06 |
| V 5000 dimethylvinylsiloxy-terminated poly(dimethylsiloxane-co-methylvinylsiloxane) having a vinyl content of 0.85 mmol/g and a viscosity of 5 Pa · s | A2) | 0.85 (Si-Vinyl) | 4.00 | 5.00 |
| V 200 dimethylvinylsiloxy-terminated poly(dimethylsiloxane-co-methylvinylsiloxane) having a vinyl content of 2.08 mmol/g and a viscosity of 2 Pa · s | A2) | 2.08 (Si-Vinyl) | 2.00 | 2.00 |
| Pt(0) complex with tetramethyl-tetravinylcyclotetrasiloxane that contains 2 wt % Pt was added (Ashby catalyst) | C) | 10 ppm Pt (per total composition) | 0.93 | — |
| dimethylhydrosilyl-terminated poly(dimethylsiloxane) having an SiH content of 1.43 mmol/g and a viscosity of 0.014 Pa · s | B) | 1.43 (Si—H) | 0.00 | 0.50 |
| resin crosslinker with an SiH content at 9.15 mmol/g and a viscosity of 0.03 Pa · s and 12 SiH groups per molecule | B) | 9.15 (Si—H) | — | 3.00 |
| ECH (1-ethynyl-1-cyclohexanol) | G) | | — | 0.11 |
| Total | | | 101.41 | 104.91 |
| Color Paste CP1 melamine cyanurate (40 wt.-% melamine cyanurate and 60 wt.-% U10 (dimethylvinylsiloxy-terminated polydimethylsiloxane (component A1)) having a viscosity of 10 Pa · s) | A1) + E) | | 5.0 | |
| Color Paste CP2 (61.2 parts U10 (dimethylvinylsiloxy-terminated polydimethylsiloxane (component A1)), 37.6 parts titanium dioxide and 1.1 parts melamine cyanurate) | A1) + F) + E) | | 4.0 | |

| | |
|---|---|
| Molar ratio $SiR^1$ (in component A2)/$SiR^1$ (in component A1) | 3.33 |
| KPSiH | 9.01 |
| SiH/$SiR^1$ | 1.23 |

Measurement results on compression set

| Hours | Temperature | Compression set (%) |
|---|---|---|
| 22 | 175° C. | 4 |
| 144 | 175° C. | 10 |
| 1000 | 175° C. | 23 |

*unless otherwise indicated.

Example 2

The following composition was prepared in the same manner as in example 1.

Table 2 summarizes the composition of example 2:

TABLE 2

| Compound | Component | Concentration mmol/g (per component*) | PARTS A | PARTS B |
|---|---|---|---|---|
| U 10 dimethylvinylsiloxy-terminated polydimethylsiloxane having a viscosity of 10 Pa · s | A1) | 0.05 (Si-Vinyl) | 17.66 | 17.58 |
| U 65 dimethylvinylsiloxy-terminated polydimethylsiloxane having a viscosity of 65 Pa · s | A1) | 0.03 (Si-Vinyl) | 29.88 | 31.62 |
| Water | G) | | 1.92 | 1.85 |
| divinyltetramethyldisilazane | D) | 10.8 (Si-Vinyl) | 0.22 | 0.21 |
| Hexamethyldisilazane | D) | | 5.09 | 4.88 |
| triazole (25% in water) | G) | | — | 0.34 |
| Aerosil 300 | D) | | 25.12 | 24.27 |
| Hexamethyldisilazane (2$^{nd}$ filler treatment step) | D) | | 1.31 | 1.33 |
| U 10 dimethylvinylsiloxy-terminated polydimethylsiloxane having a viscosity of 10 Pa · s | A1) | 0.05 (Si-Vinyl) | 16.77 | 15.86 |
| PH 300/PH LSR | G) | | 2.04 | 2.06 |
| V 5000 dimethylvinylsiloxy-terminated poly(dimethylsiloxane-co-methylvinylsiloxane) having a vinyl content of 0.85 mmol/g and a viscosity of 5 Pa · s | A2) | 0.85 (Si-Vinyl) | 4.00 | 5.00 |
| V 200 dimethylvinylsiloxy-terminated poly(dimethylsiloxane-co-methylvinylsiloxane) having a vinyl content of 2.08 mmol/g and a viscosity of 2 Pa · s | A2) | 2.08 (Si-Vinyl) | 2.00 | 2.00 |
| Pt(0) complex with tetramethyl-tetravinylcyclotetrasiloxane that contains 2 wt % Pt was added (Ashby catalyst) | C) | 10 ppm Pt (per total composition) | 0.93 | — |
| dimethylhydrosilyl-terminated poly(dimethylsiloxane) having an SiH content of 1.43 mmol/g and a viscosity of 0.014 Pa · s | B) | 1.43 (Si—H) | 0.00 | 0.50 |
| resin crosslinker with an SiH content at 9.15 mmol/g and a viscosity of 0.03 Pa · s and 12 SiH groups per molecule | B) | 9.15 (Si—H) | — | 3.00 |
| ECH (1-ethynyl-1-cyclohexanol) | G) | | — | 0.11 |
| Total | | | 101.41 | 104.91 |
| Color Paste CP1 melamine cyanurate (40 wt.-% melamine cyanurate and 60 wt.-% U10 (dimethylvinylsiloxy-terminated polydimethylsiloxane (component A1)) having a viscosity of 10 Pa · s) | A1) + E) | | 4.0 | |
| TiO$_2$ | F) | | 2.0 | |
| MgO | F) | | 2.0 | |

| | |
|---|---|
| Molar ratio SiR$^1$ (in component A2)/SiR$^1$ (in component A1) | 3.33 |
| KPSiH | 9.01 |
| SiH/SiR$^1$ | 1.23 |

Measurement results on compression set

| Hours | Temperature | Compression set (%) |
|---|---|---|
| 22 | 175° C. | — |
| 144 | 175° C. | 9 |
| 1000 | 175° C. | 25 |

*unless otherwise indicated.

Example 3

The following composition was prepared in the same manner as in example 1.

Table 3 summarizes the composition of example 3:

TABLE 3

| Compound | Component | Concentration mmol/g (per component*) | PARTS A | PARTS B |
|---|---|---|---|---|
| U 10 dimethylvinylsiloxy-terminated polydimethylsiloxane having a viscosity of 10 Pa · s | A1) | 0.05 (Si-Vinyl) | 24.66 | 24.00 |
| U 65 dimethylvinylsiloxy-terminated polydimethylsiloxane having a viscosity of 65 Pa · s | A1) | 0.03 (Si-Vinyl) | 30.20 | 31.30 |
| Water | G) | | 2.38 | 2.38 |
| divinyltetramethyldisilazane | D) | 10.8 (Si-Vinyl) | 0.27 | 0.27 |
| Hexamethyldisilazane | D) | | 6.30 | 6.30 |
| triazole (25% in water) | G) | | — | 0.34 |
| Aerosil 300 | D) | | 31.00 | 31.00 |
| Hexamethyldisilazane ($2^{nd}$ filler treatment step) | D) | | 1.60 | 1.60 |
| U 10 dimethylvinylsiloxy-terminated polydimethylsiloxane having a viscosity of 10 Pa · s | A1) | 0.05 (Si-Vinyl) | 16.77 | 15.86 |
| PH 300/PH LSR | G) | | 2.70 | 2.70 |
| V 5000 dimethylvinylsiloxy-terminated poly(dimethylsiloxane-co-methylvinylsiloxane) having a vinyl content of 0.85 mmol/g and a viscosity of 5 Pa · s | A2) | 0.85 (Si-Vinyl) | 9.00 | 4.00 |
| V 200 dimethylvinylsiloxy-terminated poly(dimethylsiloxane-co-methylvinylsiloxane) having a vinyl content of 2.08 mmol/g and a viscosity of 2 Pa · s | A2) | 2.08 (Si-Vinyl) | — | — |
| Pt(0) complex with tetramethyl-tetravinylcyclotetrasiloxane that contains 2 wt % Pt was added (Ashby catalyst) | C) | 10 ppm Pt (per total composition) | 1.16 | — |
| dimethylhydrosilyl-terminated poly(dimethylsiloxane) having an SiH content of 1.43 mmol/g and a viscosity of 0.014 Pa · s | B) | 1.43 (Si—H) | 0.00 | 1 |
| resin crosslinker with an SiH content at 9.15 mmol/g and a viscosity of 0.03 Pa · s and 12 SiH groups per molecule | B) | 9.15 (Si—H) | — | 3.30 |
| ECH (1-ethynyl-1-cyclohexanol) | G) | | — | 0.11 |
| Total | | | 133.01 | 136.20 |
| Color Paste CP2 (61.2 parts U10 (dimethylvinylsiloxy-terminated polydimethylsiloxane (component A1)), 37.6 parts titanium dioxide and 1.1 parts - melamine cyanurate | A1) + F) + E) | | 8.0 | |
| Molar ratio SiR$^1$ (in component A2)/SiR$^1$ (in component A1) | | | 2.18 | |
| KPSiH | | | 6.50 | |
| SiH/SiR$^1$ | | | 1.38 | |

| Measurement results on compression set | | |
|---|---|---|
| Hours | Temperature | Compression set (%) |
| 22 | 175° C. | — |
| 144 | 175° C. | 10 |
| 1000 | 175° C. | 30 |

*unless otherwise indicated.

Example 4

The following composition was prepared in the same manner as in example 1.

Table 4 summarizes the composition of example 4:

TABLE 4

| Compound | Component | Concentration mmol/g (per component*) | PARTS A | PARTS B |
|---|---|---|---|---|
| U 10 dimethylvinylsiloxy-terminated polydimethylsiloxane having a viscosity of 10 Pa · s | A1) | 0.05 (Si-Vinyl) | 17.66 | 17.58 |
| U 65 dimethylvinylsiloxy-terminated polydimethylsiloxane having a viscosity of 65 Pa · s | A1) | 0.03 (Si-Vinyl) | 29.88 | 31.62 |
| water | G) | | 1.92 | 1.85 |
| divinyltetramethyldisilazane | D) | 10.8 (Si-Vinyl) | 0.22 | 0.21 |
| Hexamethyldisilazane | D) | | 5.09 | 4.88 |
| triazole (25% in water) | G) | | — | 0.34 |
| Aerosil 300 | D) | | 25.12 | 24.27 |
| Hexamethyldisilazane (2$^{nd}$ filler treatment step) | D) | | 1.31 | 1.33 |
| U 10 dimethylvinylsiloxy-terminated polydimethylsiloxane having a viscosity of 10 Pa · s | A1) | 0.05 (Si-Vinyl) | 16.77 | 15.86 |
| PH 300/PH LSR | G) | | 2.04 | 2.06 |
| V 5000 dimethylvinylsiloxy-terminated poly(dimethylsiloxane-co-methylvinylsiloxane) having a vinyl content of 0.85 mmol/g and a viscosity of 5 Pa · s | A2) | 0.85 (Si-Vinyl) | 7.00 | 5.00 |
| V 200 dimethylvinylsiloxy-terminated poly(dimethylsiloxane-co-methylvinylsiloxane) having a vinyl content of 2.08 mmol/g and a viscosity of 2 Pa · s | A2) | 2.08 (Si-Vinyl) | 3.00 | 3.00 |
| Pt(O) complex with tetramethyl-tetravinylcyclotetrasiloxane that contains 2 wt % Pt was added (Ashby catalyst) | C) | 10 ppm Pt (per total composition) | 0.95 | — |
| dimethylhydrosilyl-terminated poly(dimethylsiloxane) having an SiH content of 1.43 mmol/g and a viscosity of 0.014 Pa · s | B) | 1.43 (Si—H) | 0.00 | 0.50 |
| resin crosslinker with an SiH content at 9.15 mmol/g and a viscosity of 0.03 Pa · s and 12 SiH groups per molecule | B) | 9.15 (Si—H) | — | 4.50 |
| ECH (1-ethynyl-1-cyclohexanol) | G) | | — | 0.11 |
| total | | | 107.43 | 107.21 |
| Color Paste CP2 (61.2 parts U10 (dimethylvinylsiloxy-terminated polydimethylsiloxane (component A1)), 37.6 parts titanium dioxide and 1.1 parts melamine cyanurate | A1) + F) + E) | | — | — |
| Molar ratio SiR$^1$ (in component A2)/SiR$^1$ (in component A1) | | | 4.74 | |
| KPSiH | | | 11.4 | |
| SiH/SiR$^1$ | | | 1.39 | |

| Measurement results on compression set | | |
|---|---|---|
| Hours | Temperature | Compression set (%) |
| 22 | 175° C. | 4.9 |
| 144 | 175° C. | 12 |
| 1000 | 175° C. | — |

*unless otherwise indicated.

Example 5

The following composition was prepared in the same manner as in example 1 except that a Color Paste CP3 redbrown (composed of 77 parts U 10, 0.4 parts of A 150 (Aerosil with BET surface 150 m$^2$/g) and 22.6 parts Bayferrox 140 M (Bayer pigment based on Fe$_2$O$_3$)) was added.

Table 5 summarizes the composition of example 5:

TABLE 5

| Compound | Component | Concentration mmol/g (per component*) | PARTS A | PARTS B |
|---|---|---|---|---|
| U 10 dimethylvinylsiloxy-terminated polydimethylsiloxane having a viscosity of 10 Pa · s | A1) | 0.05 (Si-Vinyl) | 17.66 | 17.58 |
| U 65 dimethylvinylsiloxy-terminated polydimethylsiloxane having a viscosity of 65 Pa · s | A1) | 0.03 (Si-Vinyl) | 29.88 | 31.62 |
| water | G) | | 1.92 | 1.85 |
| divinyltetramethyldisilazane | D) | 10.8 (Si-Vinyl) | 0.22 | 0.21 |
| Hexamethyldisilazane | D) | | 5.09 | 4.88 |
| triazole (25% in water) | G) | | — | 0.34 |
| Aerosil 300 | D) | | 25.12 | 24.27 |
| Hexamethyldisilazane (2$^{nd}$ filler treatment step) | D) | | 1.31 | 1.33 |
| U 10 dimethylvinylsiloxy-terminated polydimethylsiloxane having a viscosity of 10 Pa · s | A1) | 0.05 (Si-Vinyl) | 16.77 | 15.86 |
| PH 300/PH LSR | G) | | 2.04 | 2.06 |
| V 5000 dimethylvinylsiloxy-terminated poly(dimethylsiloxane-co-methylvinylsiloxane) having a vinyl content of 0.85 mmol/g and a viscosity of 5 Pa · s | A2) | 0.85 (Si-Vinyl) | 6.00 | 5.00 |
| V 200 dimethylvinylsiloxy-terminated poly(dimethylsiloxane-co-methylvinylsiloxane) having a vinyl content of 2.08 mmol/g and a viscosity of 2 Pa · s | A2) | 2.08 (Si-Vinyl) | 2.00 | 2.00 |
| Pt(0) complex with tetramethyl-tetravinylcyclotetrasiloxane that contains 2 wt % Pt was added (Ashby catalyst) | C) | 10 ppm Pt (per total composition) | 0.93 | — |
| dimethylhydrosilyl-terminated poly(dimethylsiloxane) having an SiH content of 1.43 mmol/g and a viscosity of 0.014 Pa · s | B) | 1.43 (Si—H) | 0.00 | 0.50 |
| resin crosslinker with an SiH content at 9.15 mmol/g and a viscosity of 0.03 Pa · s and 12 SiH groups per molecule | B) | 9.15 (Si—H) | — | 4.00 |
| ECH (1-ethynyl-1-cyclohexanol) | G) | | — | 0.11 |
| total | | | 104.45 | 105.91 |
| Color Paste CP2 (61.2 parts U10 (dimethylvinylsiloxy-terminated polydimethylsiloxane (component A1)), 37.6 parts titanium dioxide and 1.1 parts melamine cyanurate | A1) + F) + E) | | — | — |
| Color paste CP3 redbrown:U 10 77 parts; A 150 (Aerosil with BET surface 150 m2/g) 0,4 parts; Bayferrox 140 M (Bayer pigment based on Fe$_2$O$_3$) 22.6 parts | A1) + D) + E) | | 4.0 | — |
| Molar ratio SiR$^1$ (in component A2)/SiR$^1$ (in component A1) | | | 3.78 | |
| KPSiH | | | 8.5 | |
| SiH/SiR$^1$ | | | 1.49 | |

| Measurement results on compression set | | |
|---|---|---|
| Hours | Temperature | Compression set (%) |
| 22 | 175° C. | — |
| 144 | 175° C. | — |
| 1000 | 175° C. | 36 |

*unless otherwise indicated.

The invention claimed is:

1. A curable silicone rubber composition, which is curable to a cured composition having a compression set value of 30 percent or less after testing at 175° C. for 144 hours, and 50 percent or less-after testing at 175° C. for 1000 hours, when measuring the compression set of the cured silicone rubber compositions in accordance with INTERNATIONAL STANDARD ISO 815-1 First edition 2008-02-01 on a cylindrical disc of diameter 29 mm±0.5 mm and thickness 12.5 mm±0.5 mm, wherein the applied compression is (25±2) % of the original thickness of the test piece, comprising:

A) 100 parts by weight of at least one polyorganosiloxane having at least one alkenyl group R$^1$, B) 0.01 to 100 parts by weight of at least two different organohydrogensiloxanes having at least two SiH groups, selected from polyorganohydrogensiloxanes of the general formula (2):

$$[M_a D_b T_c Q_d Z_e]_m \quad (2)$$

wherein:
M=$R_3SiO_{1/2}$, and/or M*
D=$R^2Si_{2/2}$, and/or D*
T=$RSiO_{3/2}$, and/or T*
Q=$SiO_{4/2}$,
with M*=$HR_2SiO_{1/2}$, D*=$HRSiO_{2/2}$, T*=$HSiO_{3/2}$,
Z is a divalent optionally substituted hydrocarbyl bridging group with up to 14 carbon atoms between two siloxy groups, which siloxy groups are as defined before, and
R is independently selected from saturated or aromatic organic groups,
a=0.01-10
b=0-1000
c=0-50
d=0-5
e=0-3
m=1-1000,
with the proviso that there are at least two groups selected from M*, D* and T*,
and wherein:
at least a first of the at least two different organohydrogensiloxanes B) is selected from the group of B1) a resin based organohydrogensiloxane having >2 terminal SiH groups comprising at least one unit selected from T, T* and Q,
and at least a second of the at least two different organohydrogensiloxanes B) is selected from the group of B2) an organohydrogensiloxane having 2 or more SiH groups and being different from B1),
C) at least one transition metal catalyst,
D) 0.01 to 100 parts by weight of at least one reinforcing filler with a BET surface area of at least 50 m$_2$/g based on 100 parts by weight of the total amount of the components A) and B), and
G) optionally up to 100 parts by weight one or more auxiliary additives,
wherein Component A) comprises at least one of component A1), and at least one of component A2), which are defined as follows:
A1) at least one polyorganosiloxane of the formula (Ia),

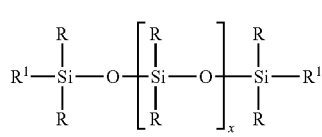

(Ia)

wherein each R is independently selected from saturated or aromatic organic groups, each $R^1$ is independently selected from alkenyl groups, and x is ≥0,
A2) at least one polyorganosiloxane of the formula (Ib),

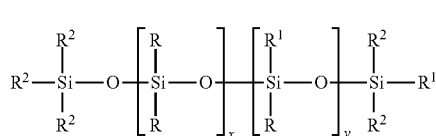

(Ib)

wherein x, R and $R^1$ are as defined above; $R^2$ is selected from R or $R^1$, and y is ≥1, and wherein the molar ratio of the alkenyl groups $R^1$ in component A2) to the alkenyl groups $R^1$ in component A1) is in the range of 0.3 to 8
and wherein the composition satisfies one or more of the following requirements a) to b):
a) the molar ratio of all SiH groups to all groups $SiR^1$ wherein $R^1$ is as defined above in the composition is ≤3; and
b) the key impact factor KpSiH in mmol/g as defined below is between 2.5 to 17.5 mmol/g;

$$KpSiH = \sum_i \left\{ [\text{Parts } B_i * SiH \text{ of } B_i] * (1 - P_i(D^*D^*)) * \left(1 - \frac{2}{SiH(B_i)*(1 - P_i(D^*D^*))}\right) \right\} * \frac{1}{\frac{SiH}{SiR^1}}$$

wherein
"parts $B_i$" are the weight percentages of the i-th component B) based on the total weight of the composition,
"SiH of $B_i$" is the SiH-content of the i-th component B) in mmol/gram,
"SiH($B_i$)" is the number of SiH-groups in the i-th component B) per molecule,
"SiH/$SiR^1$" is as defined under item a) above, $$P_i(D^*D^*) = \left[\frac{\text{mol number of } D^* \text{ groups}}{\text{mol number of groups } (D^* + D + M + M^*)}\right]^2$$

wherein
D is $R_2SiO_{2/2}$ in component B),
M is $R_3SiO_{1/2}$ in component B),
D* is $HRSiO_{2/2}$ in component B),
M*=$HR_2SiO_{1/2}$ in component B), wherein R is as defined above, and
$P_i$ (D*D*) for each respective i-th component B), having the required units, is 0 to 1.

2. The curable silicone rubber composition according to claim 1, wherein the at least one reinforcing filler D) is selected from the group of fumed silica, precipitated silica, and a surface-treated filler having a BET from 50 to 500 m$_2$/g.

3. The curable silicone rubber composition, according to claim 1, further comprising a component F), which is selected from at least one metal compound, and wherein the amount of said component F) is greater than 0 to 10 parts by weight of component F) based on 100 parts by weight of the total amount of components A) and B.

4. A curable silicone rubber composition, according to claim 1 further comprising component E), which is melamine cyanurate, in an amount of less than 5 parts by weight based on 100 parts by weight of the total amount of components A) and B.

5. A curable silicone rubber composition, according to claim 1 further comprising at least one metal compound F) and E) melamine cyanurate.

6. A curable silicone rubber composition according to claim 1 which does not comprise calcium hydroxide.

7. The curable silicone rubber composition of claim 1, wherein the transition metal catalyst C) is selected from hydrosilylation catalysts comprising at least one metal selected from the group consisting of platinum, rhodium, palladium, ruthenium and iridium.

8. The curable silicone rubber composition according to claim 1, which comprises at least one auxiliary additive G), which is different from any of the other components (A1) to D as defined above, and is selected from the group consisting of low compression set additives, surface-treating agents, lubricating oils, oil bleeding agents, and hydrosilylation inhibitors.

9. The curable silicone rubber composition according claim 1, comprising:
   100 parts by weight of the total of components A1) and A2),
   0.01 to 100 parts by weight of component B),
   0.5 to 1000 ppm, of component C) based on the weight amount of the transition metal and based on the total weight of components A) and B),
   0.01 to 100 parts by weight of component D) based on 100 parts by weight of the total amount of components A) and B),
   0 to 5 parts by weight of a further component E), which is melamine cyanurate based on 100 parts by weight of the total amount of components A) and B),
   0 to 10 parts by weight of a further component F) which is at least one metal compound based on 100 parts by weight of the total amount of components A) and B), and
   0 to 100 parts by weight of component G) based on 100 parts by weight of the total amount of components A) and B),
   wherein components A) to G) are each as defined above.

10. The curable silicone rubber composition according to claim 9, comprising less than 40 parts of the sum of the total amounts of components D), E) and F), as defined above, based on 100 parts of the total amount of components A) and B), as defined above.

11. The curable silicone rubber composition according to claim 1, further comprising:
   E) melamine cyanurate;
   F) at least one metal compound,
   G) optionally one or more auxiliary additives, and
   wherein the molar ratio of the SiH groups to the groups SiR$^1$ is ≤3.

12. The curable silicone rubber composition, according to claim 11, wherein the molar ratio of the alkenyl groups R$^1$ in component A2) to the alkenyl groups R$^1$ in component A1) is in the range of 0.3 to 8.

13. The curable silicone rubber composition, according to claim 11, comprising melamine cyanurate E) in an amount of less than 5 parts by weight-based on 100 parts by weight of the total amount of the components A) and B).

14. The curable silicone rubber composition according to claim 11, wherein the transition metal catalyst C) is selected from hydrosilylation catalysts comprising at least one metal selected from the group consisting of platinum, rhodium, palladium, ruthenium and iridium.

15. The curable silicone rubber composition according to claim 11, wherein the at least one metal compound F) is selected from the group consisting of colorless metal oxides, colored metal oxides and mixtures of colorless metal oxides and colored metal oxides.

16. The curable silicone rubber composition according to claim 15, wherein the colorless metal oxides are selected from the group of titanium oxide and magnesium oxide, and the colored metal oxides are selected from iron oxide pigments.

17. The curable silicone rubber composition according to claim 11, which comprises at least one auxiliary additive G), selected from the group consisting of low compression set additives different from components A1) to F), surface-treating agents, lubricating oils, oil bleeding agents, and hydrosilylation inhibitors.

18. The curable silicone rubber composition according to claim 11, which comprises at least one auxiliary additive G) selected from the group consisting of a low compression set additive selected from acetylene alcohols having the formula: H—CC≡R"—OH, wherein R" is an organic group, and a curing retardant or flame retardant selected from a triazole compound.

19. The curable silicone rubber composition according to claim 11, comprising:
   100 parts by weight of the total of components A1) and A2),
   0.01 to 100 parts by weight of component B),
   0.5 to 1000, of component C) based on the weight amount of the transition metal and based on the total weight of components A) and B),
   0.01 to 100 parts by weight of component D), based on 100 parts by weight of the total amount of the components A) and B),
   0.01 to 2 parts by weight of component E), based on 100 parts by weight of the total amount of the components A) and B),
   0.01 to 10 parts by weight of component F), and based on 100 parts by weight of the total amount of the components A) and B),
   0 to 100 parts by weight of component G) based on 100 parts by weight of the total amount of the components A) and B).

20. A cured silicone rubber composition obtained by curing the curable silicone rubber composition of claim 1.

21. The cured silicone rubber composition according to claim 20 having a compression set of 30 percent or less, after testing at 175° C. for 144 hours, or 50 percent or less, after testing at 175° C. for 1000 hours.

22. An article selected from the group consisting of an automotive part; an electrical part; an electronic part; a packaging part; a construction part; a household part; and, a gasket sealant, comprising the curable silicone rubber composition of claim 1.

* * * * *